United States Patent
Lo et al.

(10) Patent No.: US 10,832,480 B2
(45) Date of Patent: Nov. 10, 2020

(54) APPARATUSES, METHODS AND SYSTEMS FOR APPLICATION OF FORCES WITHIN A 3D VIRTUAL ENVIRONMENT

(71) Applicant: Meta View, Inc., San Mateo, CA (US)

(72) Inventors: Raymond Chun Hing Lo, Richmond Hill (CA); Yishai Gribetz, Belmont (CA)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 16/005,609

(22) Filed: Jun. 11, 2018

(65) Prior Publication Data

US 2019/0139309 A1    May 9, 2019

Related U.S. Application Data

(63) Continuation of application No. 15/398,697, filed on Jan. 4, 2017, now Pat. No. 10,026,232.

(Continued)

(51) Int. Cl.

| | |
|---|---|
| *G06T 19/00* | (2011.01) |
| *G06F 3/01* | (2006.01) |
| *G06F 3/041* | (2006.01) |
| *G06F 3/03* | (2006.01) |
| *G06F 3/0346* | (2013.01) |
| *G02B 27/01* | (2006.01) |
| *G06F 3/0354* | (2013.01) |
| *G06T 15/00* | (2011.01) |
| *A63F 13/42* | (2014.01) |
| *G06F 3/0481* | (2013.01) |

(52) U.S. Cl.
CPC .......... *G06T 19/006* (2013.01); *G02B 27/017* (2013.01); *G06F 3/011* (2013.01); *G06F 3/017* (2013.01); *G06F 3/0304* (2013.01); *G06F 3/0346* (2013.01); *G06F 3/03547* (2013.01); *G06F 3/0416* (2013.01); *G06T 15/005* (2013.01); *A63F 13/42* (2014.09); *G06F 3/04812* (2013.01); *G06F 2203/04105* (2013.01)

(58) Field of Classification Search
None
See application file for complete search history.

(56) References Cited

U.S. PATENT DOCUMENTS

| | | |
|---|---|---|
| 6,222,554 B1 | 4/2001 | Berry et al. |
| 2003/0032484 A1 | 2/2003 | Ohshima et al. |

(Continued)

OTHER PUBLICATIONS

International Search Report, PCT/US2017/012231, dated Mar. 24, 2017, 2 Pages.

(Continued)

*Primary Examiner* — Saptarshi Mazumder
(74) *Attorney, Agent, or Firm* — Andrew Bodendorf

(57) ABSTRACT

Aspects of the disclosed apparatuses, methods and systems provide manipulation of a virtual world three dimensional (3D) space based on input translated from the real world. Elements in the virtual world may have an associated charge and field. An element in the virtual world becomes interactive with an element translated from the real world when the translated real world element interacts with a field associated with the virtual element according to the charges. Forces may be applied to the virtual element using a real world physics model to determine a response by the virtual element to the applied force.

27 Claims, 23 Drawing Sheets

Related U.S. Application Data

(60) Provisional application No. 62/274,769, filed on Jan. 4, 2016.

(56) References Cited

U.S. PATENT DOCUMENTS

| | | |
|---|---|---|
| 2004/0164960 A1 | 8/2004 | Jacobus et al. |
| 2007/0177275 A1 | 8/2007 | Mcguire, Jr. |
| 2008/0094351 A1* | 4/2008 | Nogami .................. G06F 3/016 345/156 |
| 2008/0117289 A1 | 5/2008 | Schowengerdt |
| 2009/0040296 A1* | 2/2009 | Moscato ............ G02B 27/0172 348/53 |
| 2009/0077504 A1* | 3/2009 | Bell ........................ G06F 3/011 715/863 |
| 2010/0002154 A1 | 1/2010 | Hua |
| 2010/0093435 A1 | 4/2010 | Glaser et al. |
| 2012/0113223 A1 | 5/2012 | Hilliges et al. |
| 2013/0002591 A1* | 1/2013 | Whytock .............. G06F 3/0416 345/173 |
| 2014/0218361 A1 | 8/2014 | Abe et al. |
| 2014/0266986 A1* | 9/2014 | Magyari ............ G02B 27/0172 345/8 |
| 2014/0267420 A1 | 9/2014 | Schowengerdt |
| 2014/0368539 A1* | 12/2014 | Yeh ...................... G02B 27/017 345/633 |
| 2015/0235438 A1 | 8/2015 | Schowengerdt |
| 2015/0241698 A1 | 8/2015 | Schowengerdt |
| 2016/0307482 A1 | 10/2016 | Huang et al. |

OTHER PUBLICATIONS

Written Opinion, PCT/US2017/012231, dated Mar. 24, 2017, 6 Pages.

J. S. Kim et al., "Physics-based hand interaction with virtual objects," IEEE International Conference on Robotics and Automation (ICRA), Seattle, WA, May 2015, pp. 3814-3819.

* cited by examiner

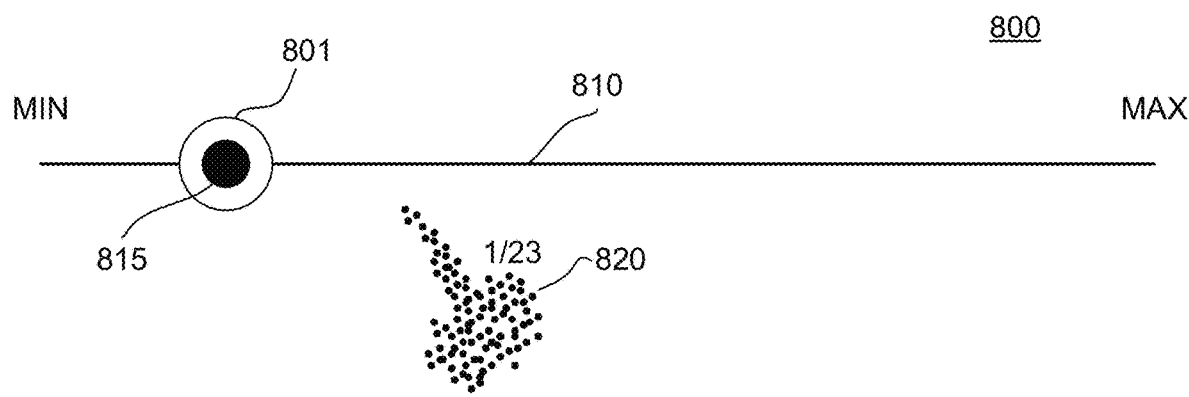
FIG. 8A
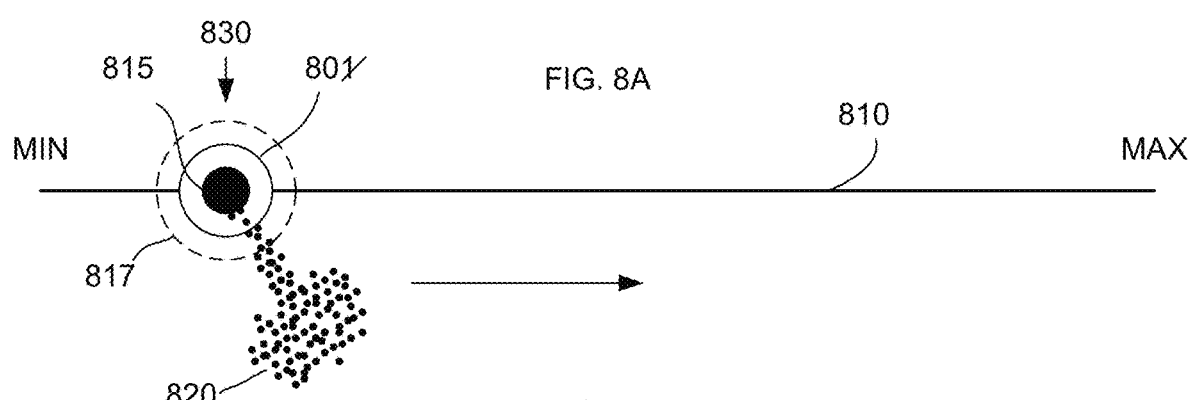
FIG. 8B
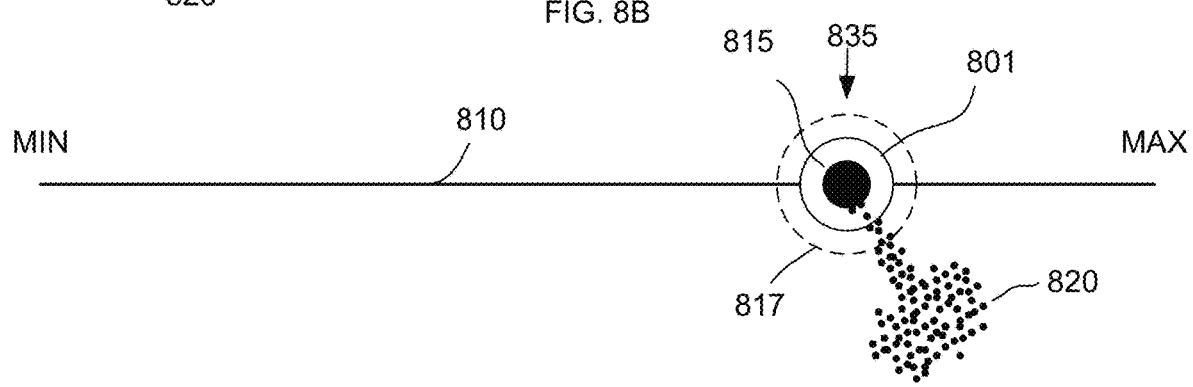
FIG. 8C
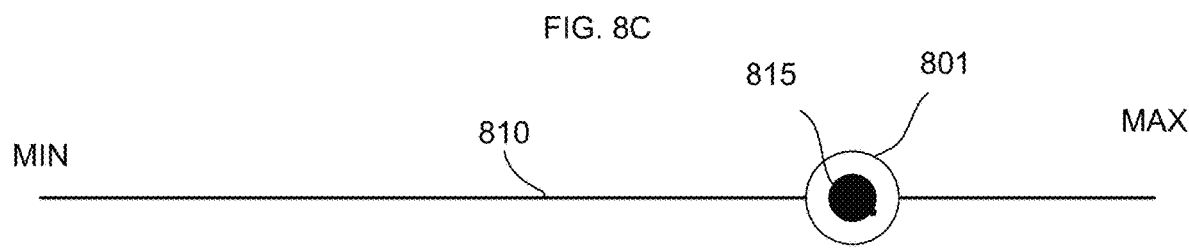
FIG. 8D
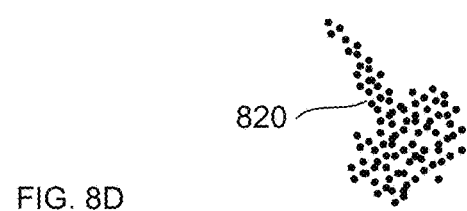

APPARATUSES, METHODS AND SYSTEMS FOR APPLICATION OF FORCES WITHIN A 3D VIRTUAL ENVIRONMENT

CROSS-REFERENCE TO RELATED APPLICATIONS

This application is a continuation of U.S. patent application Ser. No. 15/398,697 titled "APPARATUSES, METHODS AND SYSTEMS FOR APPLICATION OF FORCES WITHIN A 3D VIRTUAL ENVIRONMENT" filed Jan. 4, 2017, which claims the benefit under 35 U.S.C. § 119(e) of U.S. Provisional Application No. 62/274,769, titled "APPARATUSES, METHODS AND SYSTEMS FOR REAL WORLD OBJECT APPLICATION OF NATURAL PHYSICAL FORCES ON A 3D VIRTUAL ENVIRONMENT AND INTERFACE" filed on Jan. 4, 2016 in the U.S. Patent and Trademark Office, both of which are herein expressly incorporated by reference in their entirety for all purposes.

BACKGROUND

The interest in wearable technology has grown considerably over the last decade. For example, augmented reality (AR) displays may be worn by a user to present the user with a synthetic image overlaying a direct view of the environment. In addition, wearable virtual reality (VR) displays present virtual images to the user to provide a virtual environment. When representing virtual elements in a three-dimensional virtual environment, such as a VR environment or an AR and/or mixed reality environment, it is often difficult to provide for interaction between the virtual element and a user who exists in the real world. For example, a user may wish to select, move, translate, rotate, stretch, compress, deform, or otherwise interact with a virtual element. However, providing such interaction is often difficult.

Some AR and VR display systems are gesture based and attempt to recognize user gestures in order to allow a user to interact with the virtual environment. For example, sensors attempt to recognize movements of the user, one or more positions of user body parts, or specific user configurations, such as hand gestures (e.g., a thumbs up gesture). However, gesture based systems have a number of drawbacks. For example, a gesture based system may not be able to quickly recognize a gesture, may determine a different, unintended gesture, or may not be able to recognized a gesture at all which lead to user frustration and a bad user experience. In addition, the user may be required to "learn" the gestures, some of which may not be recognizable or easy to produce for all users. Moreover, in a global economy, some gestures may not translate across geographic or cultural boundaries resulting in having to add or build in different gestures for different users.

In addition, some systems require the user to use additional equipment, such as a wand, wristband, makings, or other additional equipment. Such solutions add expense, may be lost, or make the system less portable all of which add to inconvenience for the user.

Some AR and VR display systems also have difficulty determining whether a user is interacting with a virtual object. For example, the systems require a large number of sensors or external sensors with one or more fiducial markers to attempt to accurately map a user's environment, and then accurately map the user's position in the real world to the virtual environment. Such system may not be able to accurately identify which virtual object that a user is attempting to interact with, requiring the user to verify or retry the desired interaction, or worse incorrectly identify another object that is not desired. Such systems also may be computationally complex resulting in delay in determining and displaying the interaction, all of which leading to an experience that may not be realistic or credible to the user.

SUMMARY

Aspects of the disclosed apparatuses, methods and systems describe various methods, system, components, and techniques that allow manipulation of computer-generated elements in a virtual three dimensional (3D) space based on, for example, input translated from real world 3D point data observed by at least one sensor. In some examples, elements in the virtual world ("virtual elements")—such as individual primitives or virtual elements comprised of a composite of discrete primitive shapes—are assigned an associated charge and field, which together may be referred to as a "force field." In one example, a virtual element has more than one associated force field. A virtual element becomes interactive with an element translated from the real world (a "real world element") when the translated real world element interacts with a force field associated with the virtual element. For example, when a real world element that has been detected by a depth camera and translated into the virtual world enters the force field of a virtual element, the force exerted on the virtual element by the translated real world element is determined according to a charge associated with the force field of the virtual element. The virtual element then responds to the exerted force based on properties assigned to the virtual element and based on the properties of the virtual environment in which the virtual element and translated real world element are present.

In some examples, forces may be applied to the virtual element using a real world physics model to determine a response by the virtual element to the applied force. In addition, a virtual element may be treated as a fluid (e.g., a deformable object with a displacement property) instead of as a solid (e.g., an object with a stable, definite shape, and a definite volume). For example, in some embodiments, a translated real world element may penetrate or otherwise exist inside of a virtual element as rendered in the virtual world. Moreover, according to some embodiments, only a virtual element having a force field that has been entered by a translated real world element can be acted upon by a force from the real world translated element. As a result, virtual elements may be easily manipulated or interacted with by real world elements—such as a hand, a pencil, or a table. Additionally, the processing burden associated with rendering and manipulating the virtual elements in a 3D virtual environment may be reduced and/or simplified in an implementation, for example, by limiting processing computations associated with virtual elements to fewer instances when translated real world element and virtual elements are interacting concurrently. In addition, users are not required to use predetermined gestures, which may be misinterpreted by the system or not known by the user. The ultimate result of the operation of this system is that users may intuitively interact with virtual elements based on their everyday understanding of real world physics phenomena providing a credible, realistic interaction, while achieving efficiency from a computing perspective.

In one or more embodiments, a virtual element may be any shape or object rendered as a synthetic image by a display, a projector or other imaging component capable of generating a virtual shape or object within a virtual 3D space. Each virtual element may have associated content and a number of assigned parameters to model the properties of the virtual element in a virtual 3D interactive space. The parameters are processed to determine the behavior of the element in the virtual 3D space. Examples of parameters include a type, a charge, a field, one or more constraints, and associated content. One or more of the parameters may be permanent or changed at any time, or on the fly, to modify the behavior and/or appearance of the virtual element within the 3D virtual space. In one example, a virtual element may be constructed from a set of one or more primitives that are geometrically modelled. One or more primitives may be used, associated, or combined to represent a virtual element within the 3D virtual space. Examples of primitives may include a point, a line or a line segment, a plane (or subset of a plane with a boundary condition, such as a circle or rectangle), an ellipsoid (e.g., a sphere), a cylinder, and a torus, which are described in more detail below.

In some embodiments, a real world element is detected and modeled in the virtual world as a collection of point charges. For example, a real world object (e.g., a hand or any other real world object that may be detected by a sensor) may be modelled as a point cloud derived from the output of one or more sensing devices. In this example, a sensing device senses and/or detects a real world element and outputs a collection of point data representative of the real world element in space referred to as a "point cloud" and its movement in space over time.

The point data from the sensor is translated by a virtual world application into coordinates corresponding to the location of the point data in the virtual 3D space. In one example, the sensor may be implemented using a depth/range sensing camera, such as, for example, a Time-of-Flight (ToF) camera that returns a set of 3D points with spatial coordinates correlated with real world elements within the camera's range of vision. In this example, each point has a spatial coordinate (x, y, z), the confidence of the data (e.g., a value ranging from 0 to 1), and time stamp associated with a frame or snapshot in time from the sensor. The point cloud may be filtered, for example, using the confidence values to stabilize the input and reduce noise associated with detection of the point cloud. The filtered point cloud is then mapped to 3D virtual space coordinates to align the virtual world and the real world. The filtered collection of points also may be assigned a charge. In one example, different points corresponding to different real world elements may be assigned different charges (e.g., a point cloud associated with a user's hand may have one charge and a table surface may have a same or different charge). In addition, data and/or a unique identification (ID) may be associated with the points. In one example, a visual indication of the points in the cloud may be rendered within the 3D virtual space (e.g., to aid a user in manipulating real world objects in order to affect virtual elements in the virtual 3D space). When points within the cloud enter the field or boundary associated with a virtual element (such as a primitive), forces may be determined and applied to the primitive based on parameters assigned to the primitives and to the virtual environment to determine a response by the associated virtual element.

In one general aspect, a virtual or augmented reality display system providing interaction between a real world object and a virtual element rendered in a three-dimensional (3D) virtual space. The system includes: one or more interfaces; one or more displays; one or more storage devices storing instructions and data; and one or more processing devices operatively coupled to: receive sensor inputs via the one or more interfaces that correspond to the location of the real world object; render an image on the one or more displays; and access the instructions and data from the one or more storage devices; and execute the instructions. The instructions are configured to cause the one or more processing devices to: translate the sensor inputs to coordinates in the virtual 3D space; determine at least one virtual force field associated with the virtual element located in the virtual 3D space; determine that the translated coordinates interact with the force field of the virtual element; apply a virtual force derived from the sensor input associated with the real world object to the virtual element based on the interaction between the translated coordinates and the force field of the virtual element; and render an image of the virtual element in the 3D space in response to the applied virtual force on the one or more displays.

In one example, the virtual force field may have an associated a charge parameter and at least one distance parameter and the sensor input associated with the real world object may have an associated charge parameter. The force may be applied based on the charge parameters associated with the force field and the sensor input associated with the real world object. In another example, the virtual force field has an associated a charge parameter and at least one distance parameter and the sensor input associated with the real world objected has an associated charge parameter, and an amount of the virtual force may be determined based on the associated charge parameters and distance parameter; the determined amount virtual force may be applied to the virtual element; and the image of the virtual element in the 3D space rendered in response to the applied amount of virtual force on the one or more displays.

The virtual element may have a plurality of associated force fields.

In addition, movement of the image of the virtual element within in the 3D space may be rendered in response to the applied virtual force on the one or more displays.

The virtual element may include one or more primitives. The virtual element may be modeled and rendered in the 3D virtual space based on the primitives and one or more of virtual 3D coordinates, assigned content, and graphics. Each primitive may include a plurality of parameters assigned according to the properties desired for the corresponding virtual element. The parameters may include at least a type, a charge, and a field. The parameters may further include at least one of a size, a constraint, and coordinates. The field of the parameter may be used to determine an interactive boundary of the primitive. Moreover, the field in combination with the charge may be used to determine the at least one force field of the virtual element.

The system may further include a depth sensor operatively coupled to the interface to provide one or more of the sensor inputs. The system also may include an optical element positioned relative to the display to at least partially reflect light from the display to the eyes of user of the system and provide a perception to the user of the rendered image of the virtual element within the 3D space.

In one example, the virtual element is a user interface. In another example, the virtual element is a virtual touch pad.

In another general aspect, a method of providing interaction between a real world object and a virtual element rendered in a three-dimensional (3D) virtual space includes: receiving sensor inputs corresponding to the location of the real world object; translating the sensor inputs to coordinates in the virtual 3D space; determining at least one virtual force field associated with the virtual element located in the virtual 3D space; determining that the translated coordinates interact with the force field of the virtual element; applying a virtual force derived from the sensor input associated with the real world object to the virtual element based on the interaction between the translated coordinates and the force field of the virtual element; and rendering, on the one or more displays, an image of the virtual element in the 3D space in response to the applied virtual force.

The details of various embodiments are set forth in the accompanying drawings and the description below. Other features and advantages will be apparent from the following description, the drawings, and the claims.

BRIEF DESCRIPTION OF DRAWINGS

The following description illustrates aspects of embodiments of the disclosed apparatuses, methods and systems in more detail, by way of examples, which are intended to be non-limiting and illustrative with reference to the accompanying drawings, in which:

FIGS. 8A, 8B, 8C, and 8D show an example of implementation of a virtual slider interface using the interaction process with application of a force;

DETAILED DESCRIPTION

Figure 1:
FIG. 1 illustrates an example of a force diagram showing basic manipulation of virtual elements using forces.

The following detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims which expressly states otherwise. It is understood that "at least one" is equivalent to "a."

The aspects (examples, alterations, modifications, options, variations, embodiments, and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate embodiments may not have been presented for a specific portion of the invention or that further alternate embodiments, which are not described, may be available for a portion is not to be considered a disclaimer of those alternate embodiments. It will be appreciated that many of those embodiments not described incorporate the same principles of the invention and others that are equivalent. Thus, it is to be understood that other embodiments may be utilized and functional, logical, organizational, structural and/or topological modifications may be made without departing from the scope and/or spirit of the disclosure.

Overview

The interest in wearable technology has grown considerably over the last decade. For example, augmented reality (AR) displays may be worn by a user to present the user with a synthetic image overlaying a direct view of the environment. In addition, wearable virtual reality (VR) displays present virtual images to the user to provide a virtual environment. When representing virtual elements in a three-dimensional virtual environment, such as a VR environment or an AR and/or mixed reality environment, it is often difficult to provide for interaction between the virtual element and a user who exists in the real world. For example, a user may wish to select, move, translate, rotate, stretch, compress, deform, or otherwise interact with a virtual element. However, providing such interaction is often difficult.

Some AR and VR display systems are gesture based and attempt to recognize user gestures in order to allow a user to interact with the virtual environment. For example, sensors attempt to recognize movements of the user, one or more positions of user body parts, or specific user configurations, such as hand gestures (e.g., a thumbs up gesture). However, gesture based systems have a number of drawbacks. For example, a gesture-based system may not be able to quickly recognize a gesture, may determine a different, unintended gesture, or may not be able to recognize a gesture all of which lead to user frustration and a bad user experience. In addition, the user may be required to "learn" the gestures, some of which may not be recognizable or easy to produce for all users. Moreover, in a global economy, some gestures may not translate across geographic or cultural boundaries resulting in having to add or build in different gestures for different users.

In addition, some systems require the user to use additional equipment, such as a wand, wristband, makings, or other additional equipment. Such solutions add expense, may be lost, or make the system less portable all of which add to inconvenience for the user.

Some AR and VR display systems also have difficulty determining whether a user is interacting with a virtual object. For example, the systems require a large number of sensors or external sensors with one or more fiducial markers to attempt to accurately map a user's environment, and then accurately map the user's position in the real world to the virtual environment. Such system may not be able to accurately identify which virtual object that a user is attempting to interact with, requiring the user to verify or retry the desired interaction, or worse incorrectly identify another object that is not desired. Such systems also may be computationally complex resulting in delay in determining and displaying the interaction, all of which leading to an experience that may not be realistic or credible to the user.

The following description provides methods, systems, techniques, and components that provide technical solutions to the above mentioned and other problems preventing realistic, fluid, and intuitive user interaction with virtual elements. Moreover, these solutions change and improve the AR and VR system in which they are employed. For example, the following solutions may reduce the equipment and/or cost of AR and VR systems. In addition, the solutions allow a user to select, move, translate, rotate, stretch, compress, deform, or otherwise interact with a virtual element in an intuitive, natural, easy to learn interaction that is readily understood by users thereby increasing user satisfaction by providing a more realistic and credible user experience. As a result, a user may use an AR or VR system employing these solutions without the need for complex instructions, training, or memorization of gestures or commands.

The following description provides methods, systems, techniques, and components across that allow manipulation of computer-generated elements in a virtual three dimensional (3D) space based on, for example, input translated from real world 3D point data observed by at least one sensor. In one embodiment, elements in the virtual world ("virtual elements")—such as individual primitives (a concept that is described in greater depth below), or virtual elements comprised of a composite of discrete primitive shapes—may be assigned an associated charge and field, which together may be referred to as a "force field." In one example, a virtual element has more than one associated force field. A virtual element becomes interactive with an element translated from the real world (a "real world element") when the translated real world element interacts with a force field associated with the virtual element. For example, when a real world element that has been detected by a depth camera and translated into the virtual world enters the force field of a virtual element, the force exerted on the virtual element by the translated real world element is determined according to a charge associated with the force field of the virtual element. The virtual element then responds to the exerted force based on properties assigned to the virtual element and based on the properties of the virtual environment in which the virtual element and translated real world element are present.

In some of the examples, forces may be applied to the virtual element using a real world physics model to determine a response by the virtual element to the applied force. In addition, a virtual element may be treated as a fluid (e.g., a deformable object with a displacement property) instead of as a solid (e.g., an object with a stable, definite shape, and a definite volume). For example, in one embodiment, a translated real world element may penetrate or otherwise exist inside of a virtual element as rendered in the virtual world. Moreover, according to one embodiment, only a virtual element having a force field that has been entered by a translated real world element can be acted upon by a force from the real world translated element. As a result, virtual elements may be easily manipulated or interacted with by real world elements—such as a hand, a pencil, or a table. Additionally, the processing burden associated with rendering and manipulating the virtual elements in a 3D virtual environment may be reduced and/or simplified in an implementation, for example, by limiting processing computations associated with virtual elements to fewer instances when translated real world element and virtual elements are interacting concurrently. The ultimate result of the operation of this system is that users may intuitively interact with virtual elements based on their everyday understanding of real world physics phenomena providing a credible, realistic interaction, while achieving efficiency from a computing perspective.

In one or more embodiments, a virtual element may be any shape or object rendered as a synthetic image by a display, a projector or other imaging component capable of generating a virtual shape or object within a virtual 3D space. Each virtual element may have associated content and a number of assigned parameters to model the properties of the virtual element in a virtual 3D interactive space. The parameters are processed to determine the behavior of the element in the virtual 3D space. Examples of parameters include a type, a charge, a field, one or more constraints, and associated content. One or more of the parameters may be permanent or changed at any time, or on the fly, to modify the behavior and/or appearance of the virtual element within the 3D virtual space. In one example, a virtual element may be constructed from a set of one or more primitives that are geometrically modelled. One or more primitives may be used, associated, or combined to represent a virtual element within the 3D virtual space. Examples of primitives may include a point, a line or a line segment, a plane (or subset of a plane with a boundary condition, such as a circle or rectangle), an ellipsoid (e.g., a sphere), a cylinder, and a torus, which are described in more detail below.

In one or more embodiments, a real world element is detected and modeled in the virtual world as a collection of point charges. For example, a real world object (e.g., a hand or any other real world object that may be detected by a sensor) may be modelled as a point cloud derived from the output of one or more sensing devices. In this example, a sensing device senses and/or detects a real world element and outputs a collection of point data representative of the real world element in space referred to as a "point cloud" and its movement in space over time.

The point data from the sensor is translated by a virtual world application into coordinates corresponding to the location of the point data in the virtual 3D space. In one example, the sensor may be implemented using a depth/range sensing camera, such as, for example, a Time-of-Flight (ToF) camera that returns a set of 3D points with spatial coordinates correlated with real world elements within the camera's range of vision. In this example, each point has a spatial coordinate $(x, y, z)$, the confidence of the data (e.g., a value ranging from 0 to 1), and time stamp associated with a frame or snapshot in time from the sensor. The point cloud may be filtered, for example, using the confidence values to stabilize the input and reduce noise associated with detection of the point cloud. The filtered point cloud is then mapped to 3D virtual space coordinates to align the virtual world and the real world. The filtered collection of points also may be assigned a charge. In one example, different points corresponding to different real world elements may be assigned different charges (e.g., a point cloud associated with a user's hand may have one charge and a table surface may have a same or different charge). In addition, data and/or a unique identification (ID) may be associated with the points. In one example, a visual indication of the points in the cloud may be rendered within the 3D virtual space (e.g., to aid a user in manipulating real world objects in order to affect virtual elements in the virtual 3D space). When points within the cloud enter the field or boundary associated with a virtual element (such as a primitive), forces may be determined and applied to the primitive based on parameters assigned to the primitives and to the virtual environment to determine a response by the associated virtual element.

Force Determination

FIG. 1 shows an illustration of an example of how force may be applied to virtual elements. By assigning a charge to a point associated with a virtual element and a separate charge to a point of input associated with a real world element detected by a sensing device, the elements' interaction can be governed by Coulomb's Law, which models the electric forces between two charges. For example, the magnitude of the electrostatic force of interaction between two point charges can be programmed to be directly proportional to the scalar multiplication of the magnitudes of charges and inversely proportional to the square of the distance between them. The force is applied along the straight line joining the points. If the two points have the same charge (e.g., positive and positive), the virtual electrostatic force between them is repellant (e.g., the points try move away from each other); if the two points have different charges (e.g., positive and negative), the virtual force between them is attractive (e.g., the points try to move towards each), as shown in FIG. 1.

Coulomb's law can be stated as a mathematical expression. The scalar and vector forms of the mathematical equation are given by:

$$|F| = k_e \frac{|q_1 q_2|}{r^2} \text{ and} \qquad \text{(Equation 1)}$$

$$F_1 = k_e \frac{q_1 q_2}{|r_{21}|^2} \hat{r}_{21} \qquad \text{(Equation 2)}$$

respectively, where $k_e$ is Coulomb's constant $k_e = 8.9875 \times 10^9$ N·m$^2$·C$^{-2}$ and $q_1$ and $q_2$ are the signed magnitudes of the charges, the scalar r is the distance between the charges, the vector $r_{21} = r_1 - r_2$ is the vectorial distance between the charges, and $$\hat{r}_{21} = \frac{r_{21}}{|r_{21}|}$$

(a unit vector pointing from $q_2$ to $q_1$). For example, as shown in FIG. 1, if $q_2$ represents a point charge of an input from a sensor corresponding to an input coordinate from a point cloud associated with a real world element and $q_1$ is a point charge associated with the virtual element, then the vector form of the equation calculates the force $F_1$ applied on $q_1$ by $q_2$. The determined force can be applied to the virtual element according to one or more properties associated with the virtual element. In one embodiment, a derivative of Coulomb's law is applied to simplify the computation of force applied to a virtual element. For example, the constant $k_e$ and $q_1$ can be replaced by a single constant K, if the point charges on each primitive are constant at that instance, which is given by:

$$F_1 = K \frac{q_2}{|r_{21}|^2} \hat{r}_{21} \qquad \text{(Equation 3)}$$

Furthermore, other force mapping functions can be used to compute force applied to a virtual element—for example, to create a different behavior resulting from the force interaction. For example, the distance may be mapped to the force computation using a reciprocal function (e.g., $F \propto 1/r^4$) to obtain a faster rate of force application (e.g., when a faster response time is desired form a force interaction).

Primitives

In one embodiment, each virtual element may be expressed as one or more primitives. A data file corresponding to each virtual element modeled in the virtual 3D space includes one or more primitives, coordinates, assigned content, and/or graphics. In one example, primitives may be thought of the building blocks of virtual elements in the 3D virtual world. Each primitive includes a number of parameters, which may be assigned according to the properties desired for the corresponding virtual element. For example, parameters may include at least a type, a charge, a field, a size, one of more constraints, and coordinates. A charge combined with a field describes a force field of a virtual element.

A "type" is an identifier (ID) specifying the geometry of the primitive. Types of primitives include a point, a line or a line segment, a plane (or subset of a plane with a boundary condition, such as a circle or rectangle), an ellipsoid (e.g., a sphere), a cylinder, and a torus, which are described in more detail below. The geometric models may be specified by piece-wise parametric equations corresponding to a shape and/or a size of the primitive.

In one embodiment, the charge parameter of a primitive may be positive, negative, or no charge (e.g., 0)) and have a magnitude (e.g., 0<q<100). If the charge of the virtual element is the same as the charge associated with a point from a sensor input, then the force applied by the sensor input on the virtual element is repellant, and if the charge of the virtual element is the opposite to the charge associated with a point from a sensor input, then the force applied by the sensor input on the virtual element is attractive. In another embodiment, a primitive may have multiple charges.

The field of the primitive defines an interactive boundary of the primitive. When the field is combined with a charge, it defines a "force field" that specifies interaction with translated real world objects. In one example, the field parameter (e.g., 0 cm<$d_f$<=10 cm) is a distance d measured by a line segment of length d orthogonal to the core of the primitive at which, when coordinates of a sensor input are determined to be within it, the primitive becomes interactive (e.g., responds to forces acting on the primitive according to a charge associated with the field). Alternatively, the distance $d_f$ may be measured as a line segment of length d orthogonal to a core associated with the virtual element. When coordinates of a sensor input are determined to be within the boundary defined by the parameter, virtual object becomes active or interactive and is capable of responding in a defined manner to the sensor input (e.g., responsive to the application of force from the sensor input according to a charge associated with the field).

A primitive may have multiple force fields. In one embodiment, a primitive has at least two force fields. For example, a primitive may have a first charge (e.g., zero charge) that is applied from the core to a first field distance, and a second charge (e.g., a positive or negative charge) that is applied between the first field distance and a second field distance. For example, from the core to a first distance (e.g., 0 cm$<=df_{core}<=$5 cm), the primitive can have a zero charge to generate a neutral force field. Within the neutral force field, no forces are applied to the virtual element associated with the primitive and thus no force computation is performed. In one embodiment, providing a neutral force field around the core of a primitive prevents an infinite amount of force from being applied to the primitive and its related virtual element, for example, at an instance due to an attempt to divide by zero during a force calculation, which can result in unwanted manipulation of a virtual element. In one example, the neutral force field may be roughly correlated to the visual size or portion of the rendering of a virtual element as it appears to a user. In addition, from the first distance to the second distance (e.g., 5 cm$<df_{force}<=$10 cm), the field has a charge (e.g., positive or negative) that creates a repellant force field (e.g., charge of field is same as charge associated with a sensor input) or an attractive force field (e.g., charge of field is opposite to a charge associated with a sensor input) that governs the way that applied force (as defined by the sensor input) acts on the primitive. Beyond the second distance, the primitive is inactive. Examples of these force fields are shown in conjunction with the primitives illustrated in FIGS. 2A-2E.

In another embodiment, a primitive has three force fields: an inner neutral force field, an intermediate repellant force field, and a third outer attractive force field. In this example, the combination of force fields allows a virtual element to be moved and "held" in space as the attraction and repellent forces balance in an equilibrium state (e.g., the force of repulsion is substantially equal to the force of attraction at a specified distance from the core). An example of a primitive with three force fields configured in this fashion is shown in FIG. 2F. For example, assume a primitive has neutral force field (e.g., 0 cm$<=df_{core}<=$5 cm, charge=zero), a repellant force field (e.g., 5 cm$<df_{repel}<=$10 cm charge=positive), and an attractive force field (e.g., 10 cm$<df_{attract}<=$20 cm charge=negative), and a sensor input has a positive charge. As a sensor input coordinates move within a distance of 20 cm of the primitive, the primitive experiences an attractive force and moves toward the sensor input. As long as the sensor input maintains a distance (e.g., 10 cm$<d_{sensorinput}<=$20 cm), the primitive continues to be attracted or move towards the sensor input. If the sensor input remains in place over time, the primitive continues to be attracted and moves towards the coordinates of the sensor input until the distance from the core of the primitive reaches 10 cm. At this point, the object stops, as the attractive force generated by the attractive force field equals the repellant force generated by the repellant force field. In this sense, a virtual element is held in the virtual space. If the sensor input coordinates move within 10 cm, the primitive experiences a repellant force and movers away from the coordinates of the sensor input, giving the primitive the appearance of body or substance to the user. As long as the sensor input maintains a distance (e.g., 5 cm$<d_{sensorinput}<=$10 cm), the primitive continues to be repelled and moves away from the sensor input. If the sensor input moves within 5 cm no force is applied to the primitive, for example, to prevented unwanted force calculations and/or virtual element manipulation.

For example, if the depth camera points correspond to a user's hand and the primitive described in the previous paragraph is incorporated into a virtual element in a virtual 3D space, a user may reach towards the virtual element, breaking the outer force field of an associated primitive, and causing the virtual element to be attracted to the user's hand to the point of equilibrium between the attractive and repellent force fields associated with the primitive (i.e., until it is within 10 cm of the translated coordinates of the user's hand), at which point the virtual element will come to rest If the translated coordinates of the user's hand maintain this distance relative to the virtual element, the virtual element moves with the translated hand as long as this distance is maintained. In this manner, a user may "hold" the element. For example, when in this "hold" position, if the user's hand moves closer to the virtual element, the virtual element will move away of the user's hand, seemingly responding to the movement of the user's hand as it appears to hold the virtual element. Conversely, if the user moves his or her hand away from the virtual element with sufficient velocity, the sensor points representing the user's hand will leave the attractive force field around the virtual object, and the hand will appear to release or shake off its hold of the virtual element.

In another example, a virtual element may be held using two forces (e.g., a neutral force field surrounded by an attractive force field) in a similar manner; however, in this instance, the virtual element can be penetrated (e.g., as there is no repellant force field).

Visual parameters of the primitive may be used to define the visual properties of the primitive. For example, a size, color, and a texture parameter may be provided and used in rendering of the primitive in the virtual 3D space. In addition, a link, identifier, or pointer may be used to associate and/or map virtual content to the primitive. For example, graphics of a web page may be mapped to a panel primitive simulating a virtual 3D multi-touch pad, while allowing a user to perform click or gestures inputs on a virtual web panel.

Constraints can be used to define how the primitive responds to forces exerted on the primitive when the primitive is active. For example, a force vector and a constraint (among other parameters) may be input to a physics engine or other logic program to simulate the dynamics of the virtual 3D environment and to determine a response of the primitive to the application of the force. Examples of constraint parameters may include: drag, angular drag, mass, and center of mass, and trajectory. Drag is the force exerted in the direction opposite to the translation velocity of a primitive (e.g., $0<drag_x<1$, $0<drag_y<1$, $0<drag_z<1$). Angular drag is the force applied in the direction opposite to the rotational velocity of a primitive (e.g., $0<drag_{angular}<1$). Mass is the resistance of the primitive to being accelerated by a force applied to the primitive. In one example, the mass of a virtual element in the 3D virtual space may be 0.1 kg$<$mass$<$10 kg; however, other amounts and units of measurement may be used. Center of mass is the point (e.g. $c_m=(x, y, z)$) of the primitive where a force may be applied causing the primitive to move in the direction of the applied force without rotation. Trajectory is a pre-defined path an object can travel in a 3D virtual space, and it constrains the possible movement of the 3D virtual object (e.g., moving on a curve).

In addition, the primitive has coordinates (e.g., $p_1=(x, y, z)$) associated therewith to define its position in a virtual space and where the primitive is rendered for display.

Figure 2A:
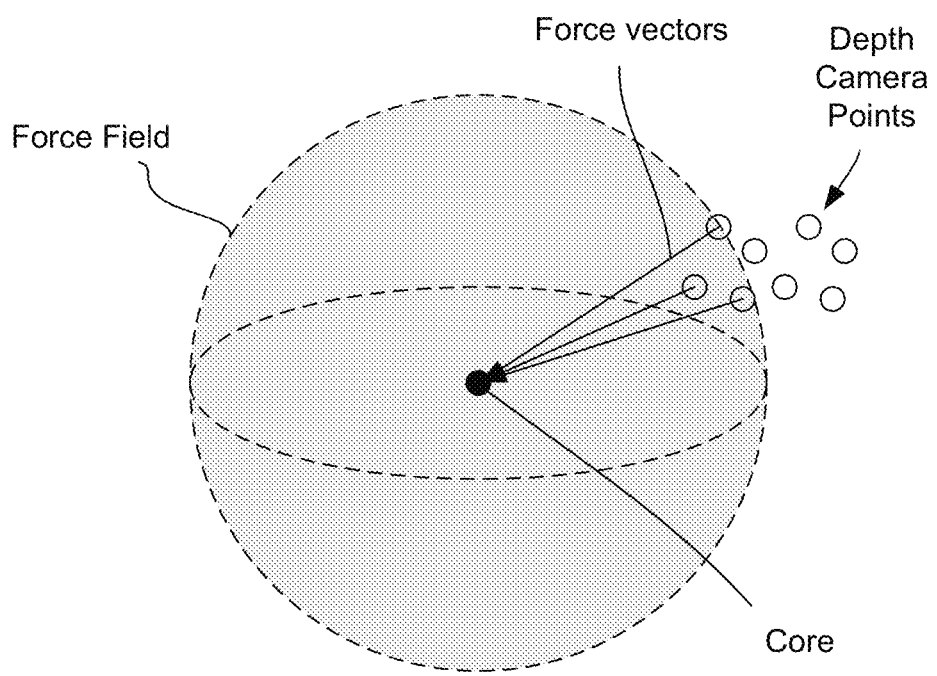
FIGS. 2A, 2B, 2C, 2D, 2E, and 2F show examples of primitives that may be used to build virtual elements.
Figure 2B:
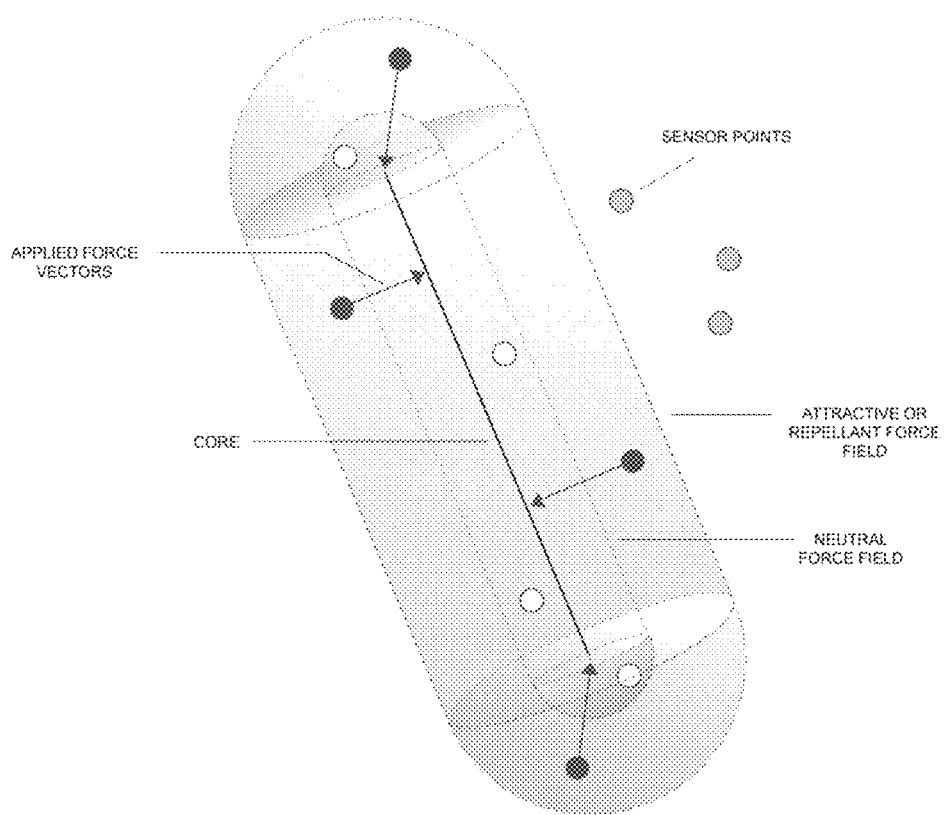
Figure 2C:
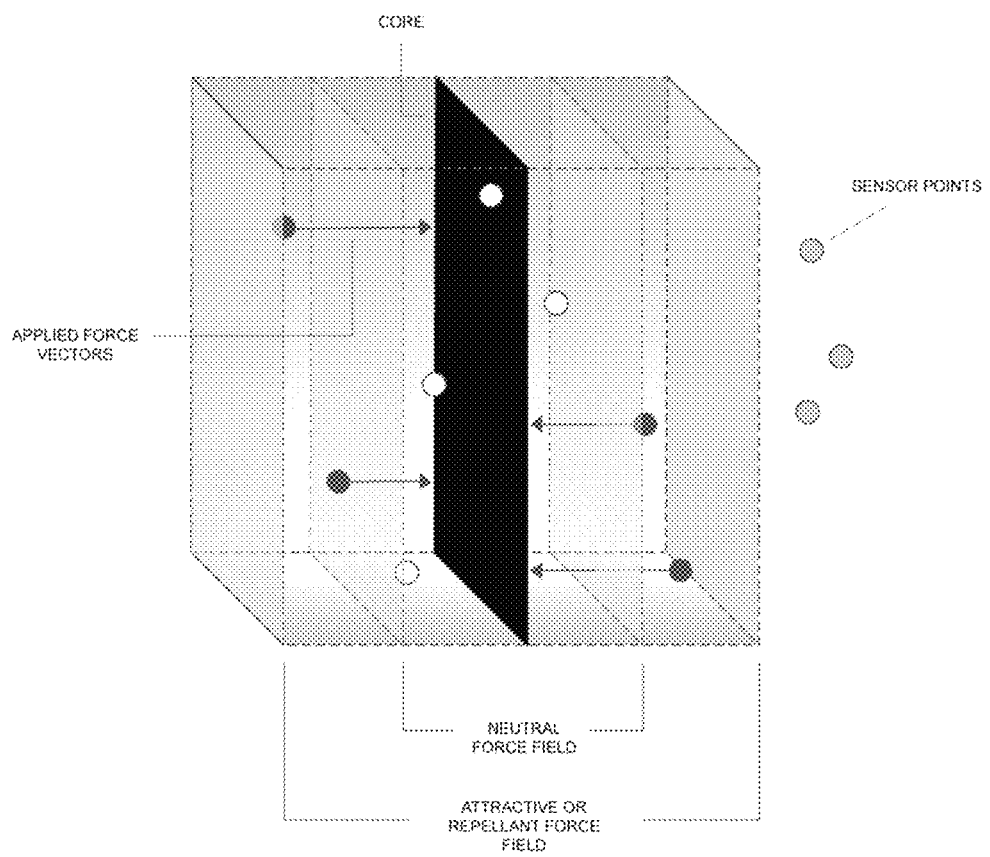
Figure 2D:
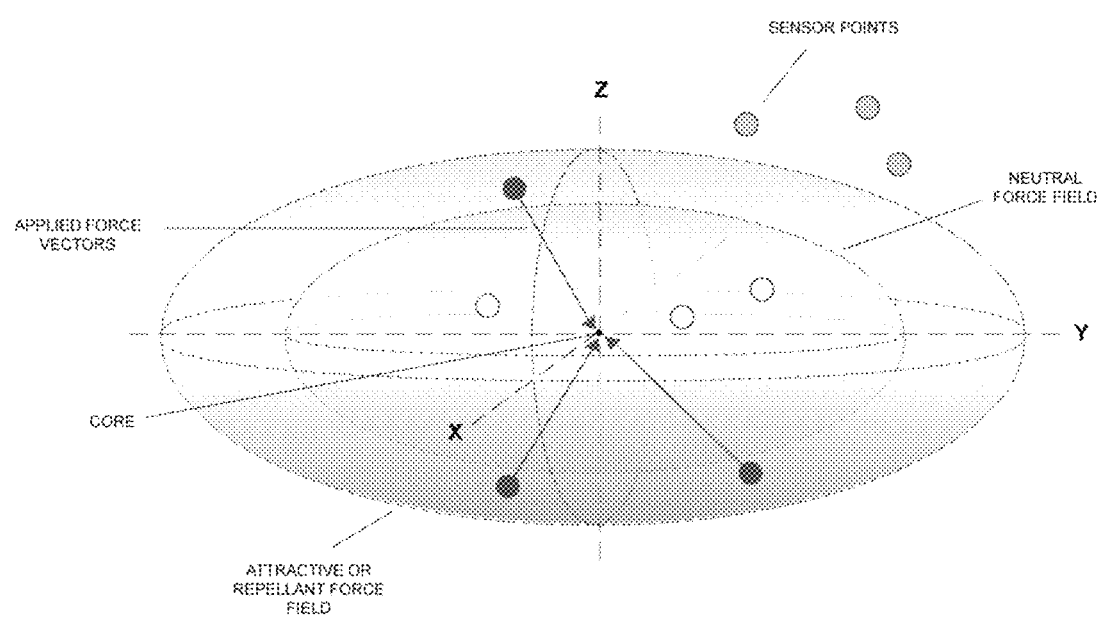
Figure 2E:
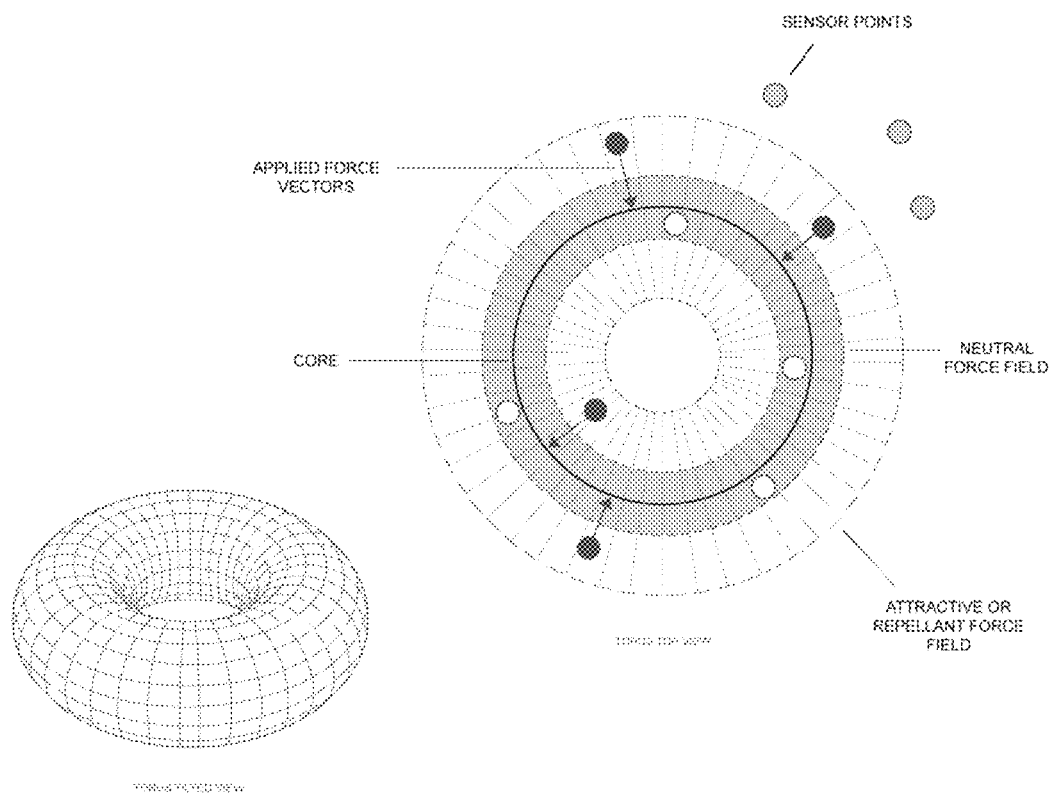
Figure 2F:
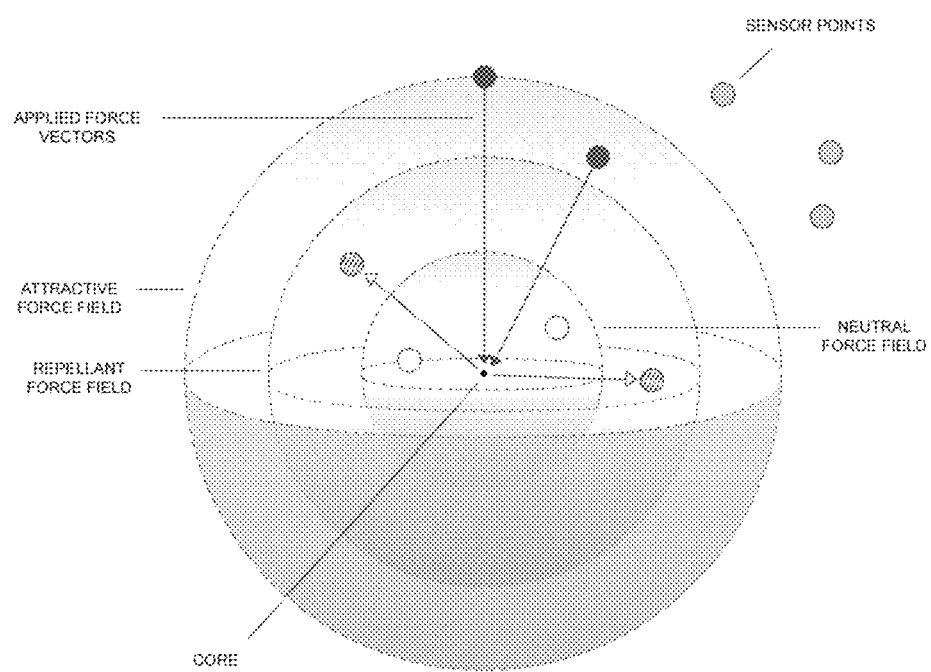

FIGS. 2A, 2B, 2C, 2D, 2E, and 2F show examples of primitives that may be used to build virtual elements. As previously stated, the primitives are the building blocks of the virtual elements in a virtual 3D space. For example, individual primitives may be used, or one or more of the same or a mixture of different primitives may be combined, to model virtual elements in a virtual 3D space. FIG. 2A illustrates an example of a point primitive with an associated force field. A point primitive represents a single point in a virtual 3D space. FIG. 2B illustrates an example of a line primitive with an associated force field. The line primitive represents a line or a line segment in the 3D space. FIG. 2C illustrates an example of a plane primitive with an associated force field. The plane primitive represents a plane or a subset of a plane (i.e., a plane type object with a boundary condition forming a closed loop, such as, for example, a circle, a triangle, a rectangle or other 2D polygon). FIG. 2D illustrates an example of an ellipsoid primitive with an associated force field. An ellipsoid primitive represents a 3D closed quadric surface analogue of an ellipse, including a tri-axial ellipsoid, oblate ellipsoid of revolution; a prolate ellipsoid of revolution, and a sphere. The cylinder primitive is a 3D object having a surface formed by the points at a fixed distance from a given straight line or axis. FIG. 2E illustrates an example of a torus primitive with an associated force field. The torus primitive is a 3D object having a surface of revolution generated by revolving a circle in three-dimensional space about an axis coplanar with the circle. FIG. 2F illustrates an example of a sphere primitive (which is a special case of an ellipsoid primitive) with associated force fields.

Additional primitives, or combination of primitives forming a superset (e.g., a rectangular frame formed by four lines joined as a rectangle as a rigid body) can be created and defined, and the above list and drawings are not meant to be the only examples of shapes that may be assigned to a primitive. This enables modeling of an infinite number of differently shaped virtual elements by combining primitives to simulate a rigid body and corresponding force field approximating the shape of any virtual element.

One will appreciate, that one or more of the parameters may be designated as permanent or dynamic (e.g., changed by an application at a point in time to modify the behavior and/or appearance of the virtual element within the 3D virtual space). For example, the charge of a force field of a primitive could be changed by an application during operation of the application from positive to negative to change the behavior of the primitive over time or in response to a particular event.

Force Field & Interactivity

As mentioned above, primitives can be assigned a force field that forms an interactive boundary that is used to determine whether—and under what circumstances—a primitive is interactive (e.g., the primitive may respond to a force based on its associated properties). For example, the force field can be expressed by at least one distance parameter $d_f$ and an associated charge. The distance defines a boundary formed around the primitive at the distance $d_f$ measured orthogonally from the core of a primitive. In another example, the force field can be expressed by multiple boundaries $d_{inner}$ and $d_{outer}$ (e.g., $d_{inner} < df <= d_{outer}$) measured orthogonally from the core of a primitive and a charge. Examples of force fields in relation to various sensor input points are illustrated in FIGS. 2A-2F for the various primitive types. When one or more sensor inputs (e.g., coordinates of a point from the point cloud associated with a real world element) are within the boundary defined by the force field, the primitive becomes interactive and force may be applied to the primitive. Thus, in one example, the force field boundary can reduce the computational burden associated with processing of virtual elements in a virtual 3D space by only determining forces and/or other computations associated with virtual element that is within range of a point cloud. As a result, any point cloud that is not within the boundary of the force field is not is not involved in any computation associated with the virtual elements.

Figure 3:
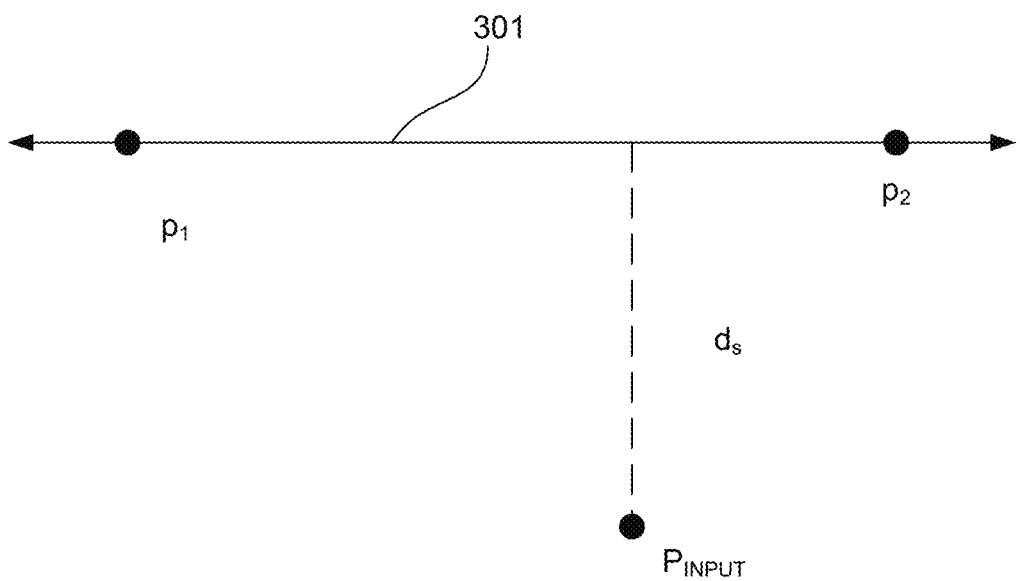
FIG. 3 illustrates an example of interaction with a force field of a primitive.

In one example, the primitive is interactive when the distance $d_s$, corresponding to the length of a straight line segment orthogonal to a point on the core of the primitive extending from the point on the core to the coordinates of the point associated with an input from a sensor, is less than $d_f$. FIG. 3 illustrates one example of this determination for a line primitive. As shown in FIG. 3, a line primitive is expressed by two points $p_1$ $(x_1, y_1, z_1)$ and $p_2$ $(x_2, y_2, z_2)$ on the line segment 301. $p_{input}$ $(x_{input}, y_{input}, z_{input})$ represents the input point from a sensor corresponding to a real world object. The shortest distance $d_s$ from $p_{input}$ to the line segment may be determined as:

$$d_s = \frac{|(p_{input} - p_1) \times (p_{input} - p_2)|}{|p_2 - p_1|} \quad \text{(Equation 4)}$$

If $d_s < d_f$, then primitive 301 is interactive.

Virtual Element Manipulation

Figure 4:
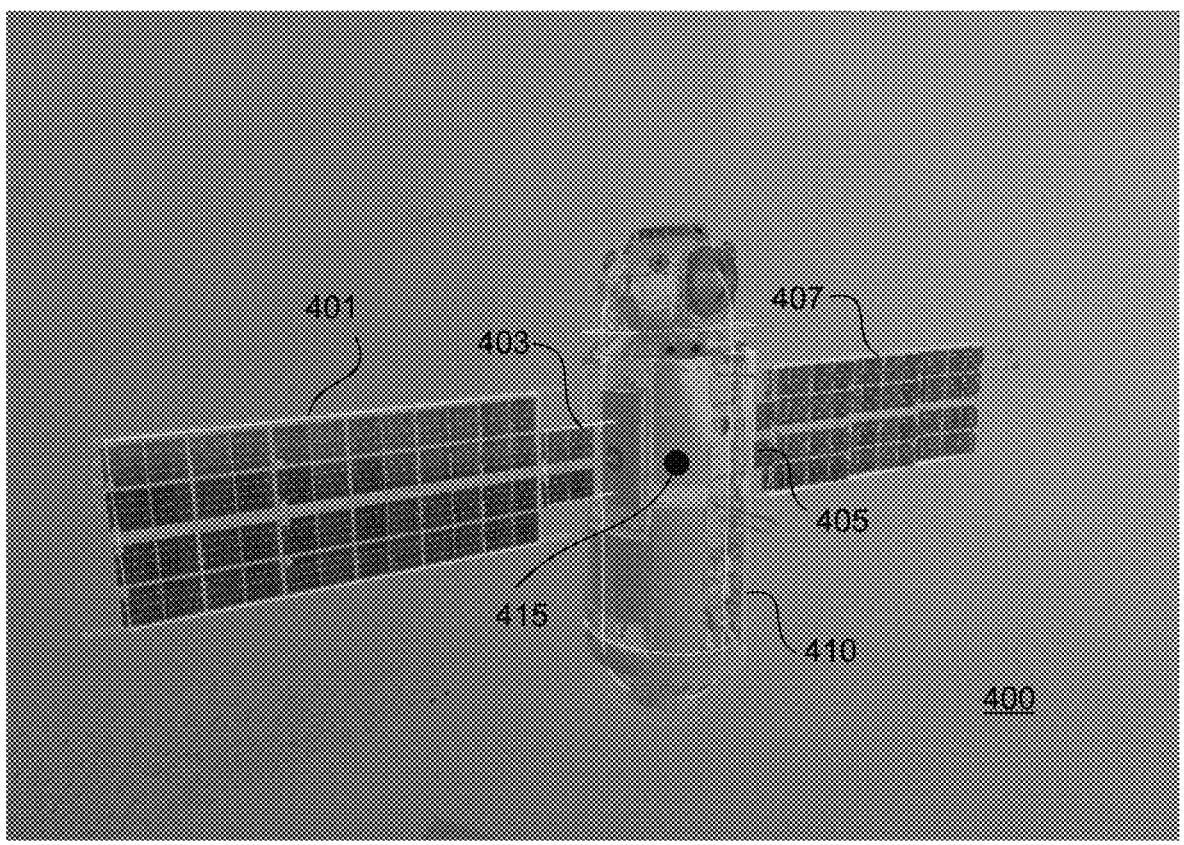
FIG. 4 illustrates application of primitives to content.

FIG. 4 illustrates an example 400 of the application of primitives to define content in a virtual 3D space and therefore make the content interactive (according to the parameters assigned to any underlying primitive associated with the content). In one example, content of a graphics data file includes data to render 3D graphics depicting a satellite telescope in a virtual 3D space. In order to make the content interactive in the virtual space, one or more primitives are associated with the content. In one example, primitives may be utilized in a modular fashion to emulate the perceived shape of the content and to make content interactive in the virtual world. For example, four plane primitives 401, 403, 405, 407, and a cylinder primitive 410 are mapped to the content of the graphics file to create a virtual element with a center of mass 415. Together, the primitive and the graphics content create a rigid body, in which the rotation and translations of the body are coupled.

Figure 5A:
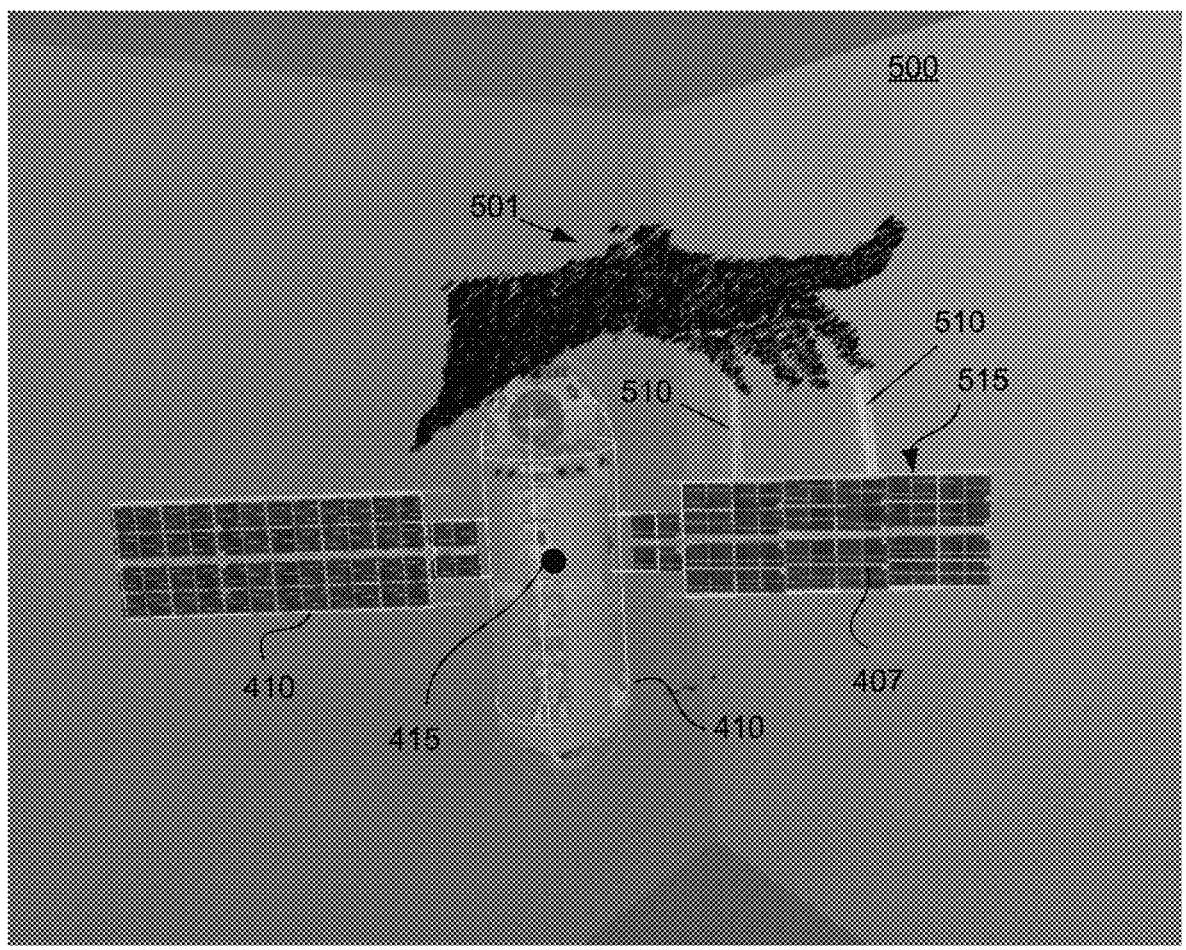
FIGS. 5A and 5B illustrate sensor input, vectors, and primitives applied to content.
Figure 5B:
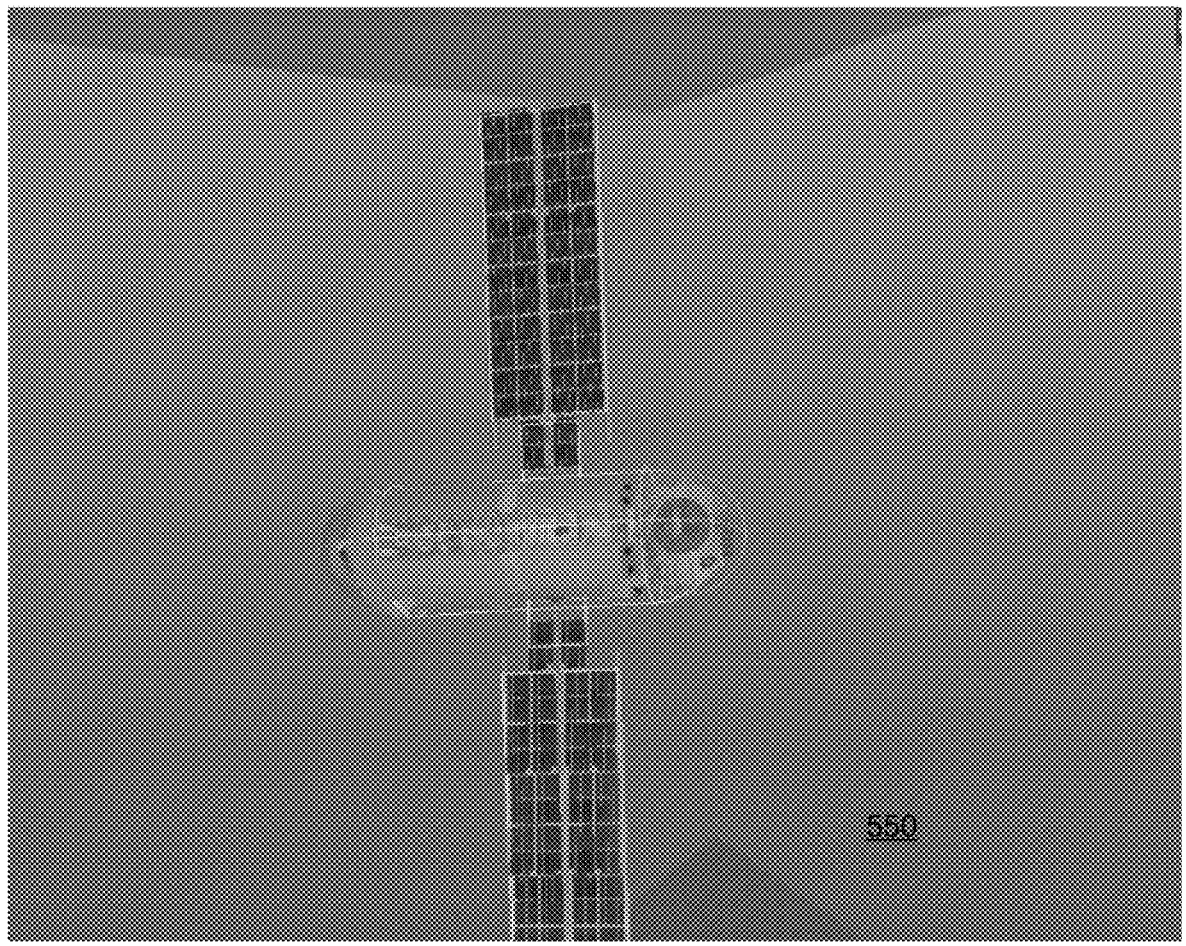

FIG. 5A illustrates an example 500 of the rendering of the virtual element of FIG. 4 (e.g., a depiction of a satellite telescope) including a visual representation of point cloud 501 derived from sensor input (e.g., depth coordinates of a hand of user). FIG. 5A shows a first orientation 500 of the satellite telescope. Force vectors 510 are illustrated as lines extending from the hand to an edge 515 of the primitive 407. As the point cloud of the user's hand moves towards the edge of the primitive 407, a force is applied to the edge causing the primitives 401, 403, 405, 407, and 410 and the associated content to rotate about the center of mass 415 to a new orientation 550 in the virtual space, as shown in FIG. 5B. One skilled in the art will appreciate that the illustration of the force vectors as white lines 510 is shown in FIG. 5A to aid understanding of the embodiment of FIGS. 4, 5A, and 5B, and actual rendering of a virtual 3D space does not require graphic depiction of the force (much in the way force is not seen in the real world), unless depicting the force is desired in any particular application (e.g., a user tutorial on how to interact with a virtual environment). Similarly, the point cloud 501 corresponding to the sensor input does not have to be rendered or depicted unless desired. For example, in an augmented reality application, the point cloud may not be illustrated; the hand of a user may be directly viewed within the rendered virtual space interacting with the virtual elements. In another example, in a virtual reality application, the point cloud or some other visualization associated therewith can be rendered in the virtual space to aid the user in controlling, manipulating, and interacting with virtual element to show a corresponding location of the real world element and translated into the virtual world in relation to the virtual elements.

Figure 6:
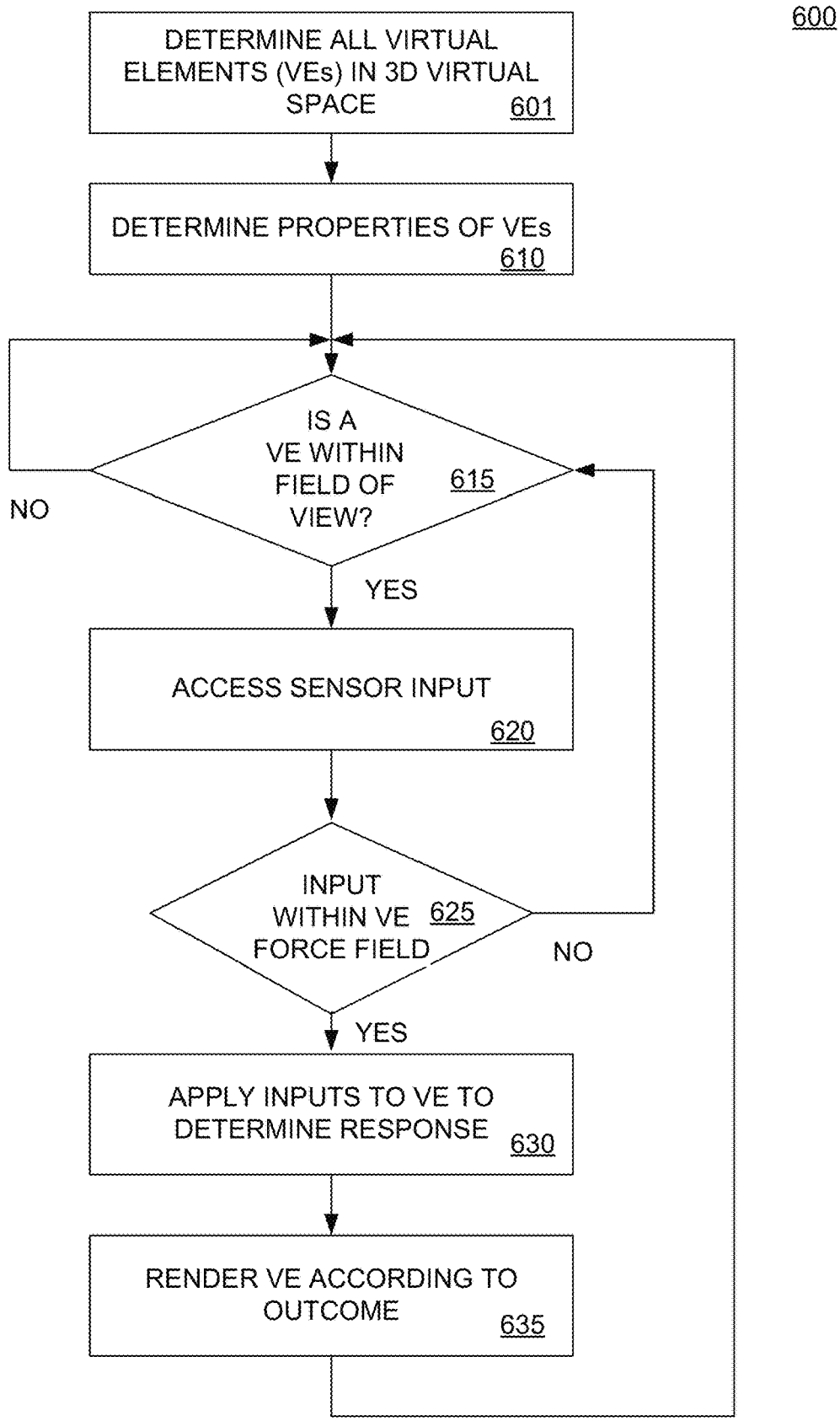
FIG. 6 is a flow chart showing an exemplary process for interacting with virtual elements.

FIG. 6 is a flowchart showing an exemplary process 600 for interacting with virtual elements implemented by a processing device. In operation 601, all of the virtual elements in the 3D virtual space are determined. For example, one or more files corresponding to the virtual 3D space are accessed from a memory device. The virtual elements are mapped to initial coordinates within the 3D virtual space.

In operation 610, the properties of all the virtual elements determined to be in the virtual 3D space are accessed from a corresponding file in a memory device. For example, the primitives and their corresponding parameters are accessed, such as a force field (e.g., charge and one or more field boundaries).

In operation 615, it is determined whether a virtual element is in a field of view of a sensor. For example, a sensor detecting real world objects may be oriented to coincide with the field of view of a user of a head mounted display (HMD). As the camera is pointed in a direction corresponding to the movement of the head of user, the view in the virtual 3D space may be mapped to coincide with the movement of the sensor and head. Scanning continues with movement of the user's and/or camera's field of view.

When one or more virtual elements are detected, any sensor input corresponding to the field of view is accessed, in operation 620. For example, frames of input from a depth sensor may be accessed and inputs of real world elements mapped to the virtual 3D space. In one example, a hand of user may be detected and mapped or translated to coordinates in the virtual 3D space.

In operation 625, for any sensor input, it is determined whether any of the sensor input is within a force field of a virtual element. For example, a shortest distance calculation as explained above in association with FIG. 2 may be performed to determine whether a coordinate in the virtual space corresponding to a sensor input is within boundary of a virtual element as defined by the force field parameter. A spatial partitioning method (i.e., a process of dividing space into indexed and searchable regions) may be applied to speed up the boundary-checking process, and may reduce the computation overhead on the distance calculation. If no sensor input is detected within the force field of a virtual element, the process returns to operation 615.

In operation 630, for each virtual element having its force field penetrated by a sensor input, the sensor inputs are applied to the virtual element to determine how the virtual element responds. For example, a force may be determined and applied to the virtual element to determine a response of the virtual element to the applied force.

In operation 635, the virtual elements are rendered according to the outcome of the response determined in operation 630, and the process returns to operation 615. For example, the orientation of a virtual element may be rotated around a center of mass associated with the virtual element in response to sensor input corresponding to the user's hand "pushing" on a portion of the virtual element to rotate it (e.g., as shown in FIGS. 5A and 5B).

Figure 7:
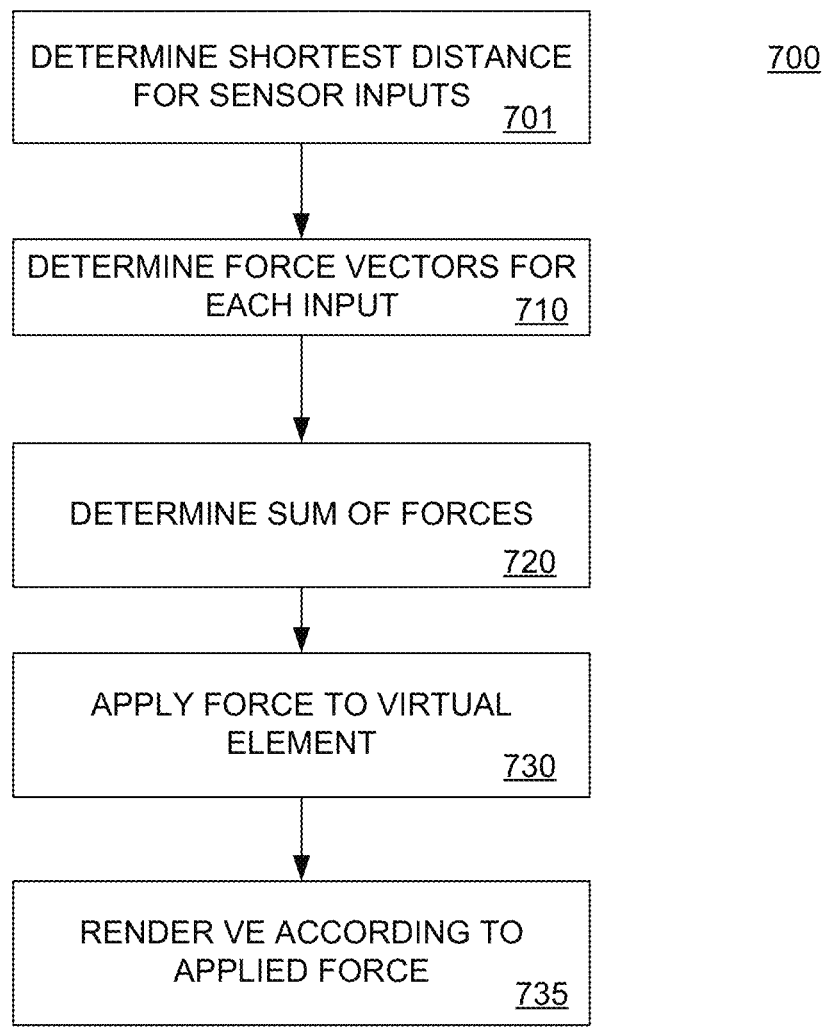
FIG. 7 is a flow chart showing an exemplary process for application of force to a virtual element.

FIG. 7 is a flow chart showing one exemplary process 700 for application of sensor inputs to a virtual element. In one example, the process 700 may be implemented as part of operation 630 in the process 600.

In operation 701, the shortest distance $d_s$ to a virtual element for each sensor input is determined. For example, the length of a straight line segment orthogonal to a point on the core extending from the point on the core to the coordinates of a point $p_i$ (e.g., associated with an input from a sensor) is determined.

In operation 710, a force vector for each sensor input is determined. For example, the charge and magnitude of the force field is determined (e.g., $q_1$) and the charge and magnitude of the input from the sensor is determined (e.g., $q_i$) and the force is calculated as $$F_1 = k_e \frac{q_1 q_i}{|r_{i1}|^2} \hat{a}_{s_{i1}}.$$

In operation 720, the forces for all vectors of points within the force field of the virtual element are summed to determine the total force exerted on the element. For example, the total force exerted on the element can be calculated through the use of the equation F_f=Sum(F_i)

In operation 730, the sum of the forces is applied to the virtual element and an outcome is determined based on the result of that application. For example, the calculated force for each vector and the parameters of the primitive (e.g., a constraint such as mass and center of mass) are put into to a physics engine or other logic that defines the nature of a manipulation of virtual elements in the virtual 3D space. In one embodiment, the physics engine may be a process or application including a collection of equations simulating real world physics and the application of forces. For example, given the force, mass, and center of mass of the virtual element, the physics engine determines a direction and distance traveled in the virtual space from the application of the force, such as determining the linear and angular momentum of a primitive by determining the position and velocity of the primitive relative to the coordinate for the primitive's center of mass.

In operation 735, the outcome is rendered and acted upon. For example, the output from the physics engine describing a direction of movement, an end move coordinate, and an orientation is provided to processor for translation to a graphics rendering of the virtual element in space over time. For example, an application of force to a virtual element may move the virtual element in the virtual 3D space from a first coordinate to a second coordinate along a line and distance determined by the engine. In another example, a force may be applied to a virtual button or touch panel. The movement of the button along a direction of constraint may cause the button to be rendered as depressed and an input corresponding to depressing the button may be activated (e.g., hitting an enter button on a virtual keypad).

Slider Interface Example

FIGS. 8A, 8B, 8C, and 8D show an example 800 of a manipulation of a slider bar interface using the interaction process with application of a force. As shown in FIGS. 8A-8D a slider bar interface 800 includes a button 801 rendered on a line 810 depicting a visual display representation of a virtual user interface. For example, the position of the button on the line may correspond to a volume of an audio device controlled by the user interface. As the position of the button moves along the bar, a corresponding trigger event adjusts the volume level of the audio device.

For example, a sphere primitive 815 is constrained to only allow movement along a single dimension (e.g., the x-axis) and thus form a slider interface in this dimension. In this example, a large drag constraint may be placed on two of the three dimensions of the virtual space, where drag.x=1, drag.y=100, drag.z=100. In addition, the force field 817 of a sphere primitive are set, for example, the sphere.charge=+ 10 and sphere.boundary=1-5 cm. In addition, a trigger for an event may be defined with the following pseudo code, for example:

if (position.cloud>interface.boundary){create_event(adjust volume)};

In this example, assume a point cloud 820 from an input sensor (e.g., corresponding to the hand of user) is given a charge=−10. In FIG. 8A, the point cloud is outside of the 5 cm force field boundary of the button virtual element so the button 801 is not active. In FIG. 8B, the point cloud moves inside of the 1 cm to 5 cm force field boundary 817. In this case, the force applied to the button is determined. Because the charges of the virtual button and the point cloud are opposite, the force applied to the button is attractive. Because the force is attractive, the button may be thought of as "sticky"—or in other words, it is constrained so that the button moves with the point cloud. Therefore, as long as the point cloud remains with the boundary 817, as the point cloud moves, the button moves with the point cloud. In this example, the virtual element is constrained only allowing movement along one axis. Therefore, as the point cloud 820 moves along the line 810 of the slider interface, the button 801 moves from position 830 (e.g., associated with volume level 15%) in FIG. 8B to position 835 in FIG. 8C (e.g., associated with volume level 75%). This activity can trigger, for example, the event "adjust volume" which uses the position 835 associated with the sphere primitive relative to the line 810 to increase the volume of the associated audio device to 75% of max volume.

In FIG. 8D, the point cloud moves outside of the 5 cm force field boundary of the button virtual element, and the event therefore ends, with the volume remaining at 75% because the button is no longer interacting with the point cloud.

Of course, one skilled in the art will appreciate that, in another example, the charge associated with the point cloud 820 can be +10. In this case, the force applied by the point cloud 820 on the button is repellent to the button 801 (the charge of which is also +10, as described above). Therefore, the user input associated with the point cloud 820 can be used to "push" the button along the slider to a desired position.

In another example, an additional line primitive may be associated with the line 810 of the virtual volume user interface, and the graphics, sphere, and line primitives form the virtual element within a virtual 3D space. In this example, sphere primitive may be used to adjust the volume of the interface by movement along a single axis as describe above, and the line primitive may be used to adjust the position and orientation of the visual representation of the interface within the 3D space.

Button or Touch Panel Interface

Figure 9:
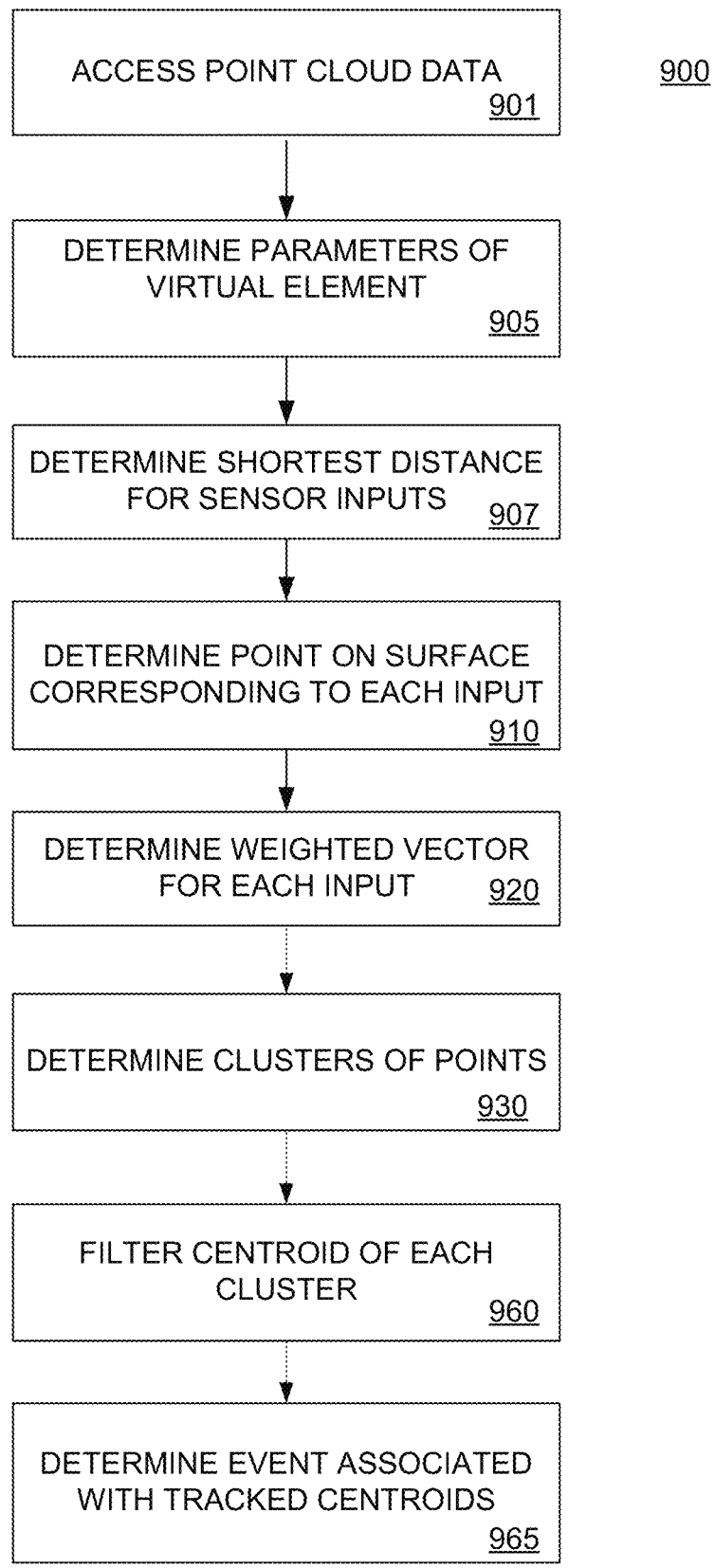
FIG. 9 is a flow chart showing an exemplary process for interaction with a virtual element.

FIG. 9 is a flow chart showing another exemplary process 900 implemented by a processing device for interaction with a virtual element, such as for example, a button or user interface of a touch panel.

In operation 901, a point cloud from a sensor is received or accessed. Each point of the cloud corresponds to a sensor output. For example, for one frame of the output from a depth camera, the location of all points within a 3D virtual space corresponding to each sensor input for the frame are determined.

In operation 905, the parameters of a virtual element are determined. For example, the primitive type, the position of the primitive within the 3D virtual space, and the force field parameters are determined for the virtual element. In this example, a plane primitive is used to simulate the surface of a touch panel interface (the "panel") having a force field parameter with a charge of zero from 0 cm to 5 cm from the core plane of the primitive.

In operation 907, the shortest distance from the points of the cloud to the panel are calculated. For example, a line orthogonal to the surface of the primitive and intersecting a point of the cloud is determined for each point of the cloud.

In operation 910, each point of the cloud within the force field boundary is back-projected onto the surface of the virtual element. For example, all points of the cloud having a shortest distance that is less than the distance of the force field parameter are determined. All points determined to be within the force field of the virtual element are back-projected on the surface of the primitive at the point located where each orthogonal line corresponding to the shortest distance to a sensor input intersects the surface of the primitive of the virtual element.

In operation 920, a weighted vector (e.g., (x, y, w) where x, y are the coordinates of the vector and w is the weight of the interaction with the primitive) is determined for each back-projected point. For example, a weight w for sensor input i is determined as $w_i=f(c)*g(d_i)$ where c is a confidence value of the point cloud data and d is the distance of the input i from the primitive, and f(x) and g(x) are penalty functions for each parameter c and d. In this example, w implements a noise filter and penalty functions to decrease the significance of the weight of an input when the data may be noisy. In one example, a penalty function observes the distribution of the points (i.e., the variance) of the point of cloud to adjust the w (e.g., when the points of the cloud are clustered tightly the variance is considered to be lower confidence is higher, and when the points are distributed variance is greater and confidence is lower). In operation 930, "clusters"—a group of points that are contained within a fixed boundary—are determined and tracked from the back-projected points. When a group of back-projected points is clustered on surface of a primitive modeling a virtual element that resembles and functions as a multi-touch panel, it may indicate that a user is interacting with the surface of the panel (e.g., entering an input of a button or adjusting the presentation of content, such as pinch to zoom). In this example, a clustering algorithm may be applied to all the back-projected points to determine clusters or groups of related points and track them (e.g., to determine an event related thereto such as a scroll event). To do this, first, a cluster list is created. For the first frame of sensor data received, the cluster list does not contain any clusters, as the clusters have not yet been calculated from the back-projected points. The back-projected points determined from the first frame are then clustered.

In one example of the clustering process, a bounding box of a predetermined size may be used (e.g., a 3×3 cm box) to determine a cluster. The primitive surface is first scanned for back-projection points. When a back-projection point of the back-projected image is detected, it is determined whether the point falls into the bounding box of a previously identified cluster. If no previously identified cluster exists around the point, a new cluster is created, a unique ID is assigned to the cluster, the point is added to the cluster, and the ID is added to the list. For each new cluster, it is determined if any additional points are within the bounding box around the point. For each additional point within the box, the point is added to the cluster ID. The scan continues until all points are assigned to a cluster ID. The clusters are then filtered to remove clusters that may be associated with noise. For example, any cluster having too few back projection points is removed and its ID is deleted from the cluster list.

A centroid (e.g., the arithmetic mean ("average") position of all the points in the cluster) is determined for each cluster ID and the position of the centroid is stored with the cluster ID. The centroid is considered the location of the cluster on the panel virtual element.

The cluster list with the IDs and location of each cluster is matched against the cluster list derived from the last input frame to determine whether any cluster corresponds to a previous cluster. For example, if the distance between the locations of two clusters is less than the size of the cluster-bounding box, the clusters are considered matching clusters. In this case, the ID of the current cluster is removed from the list, and the position of the centroid of the current cluster (e.g., the location on the panel) of the cluster position is added to the ID for the previous matching cluster. For any cluster not matching a previous cluster, the unique ID is preserved in the list. In this manner, the movement of a cluster may be traced from one sensor input frame to the next.

In operation 960, the location saved for each cluster of an ID in the list is filtered. For example, a motion filter, for example, such as Kalman filter or the like is applied to each tracked location associated with an ID to reduce effects such as jitter. The filtered location is then saved to the cluster list.

In operation 965, it is determined whether an event associated with the centroids stored in the cluster is triggered. For example, in an implementation of multi-touch panel virtual element, the position of one or more tracked centroids may indicate a trigger event, such as a swipe, a tap, or a multi-finger gestures (e.g., a pinch to zoom event). For example, movement of a cluster along a line for a predetermined distance in the same direction may indicate that a scroll up event has been triggered causing the content presented in association with the virtual panel to scroll up.

The process for operations 901-965 are continually repeated for each frame input from the sensor.

FIGS. 10A, 10B, 10C, 10D, 10E, 10F illustrating an example of the interaction process of FIG. 9 applied to a user multi-touch panel virtual element implementation.

Figure 10A:
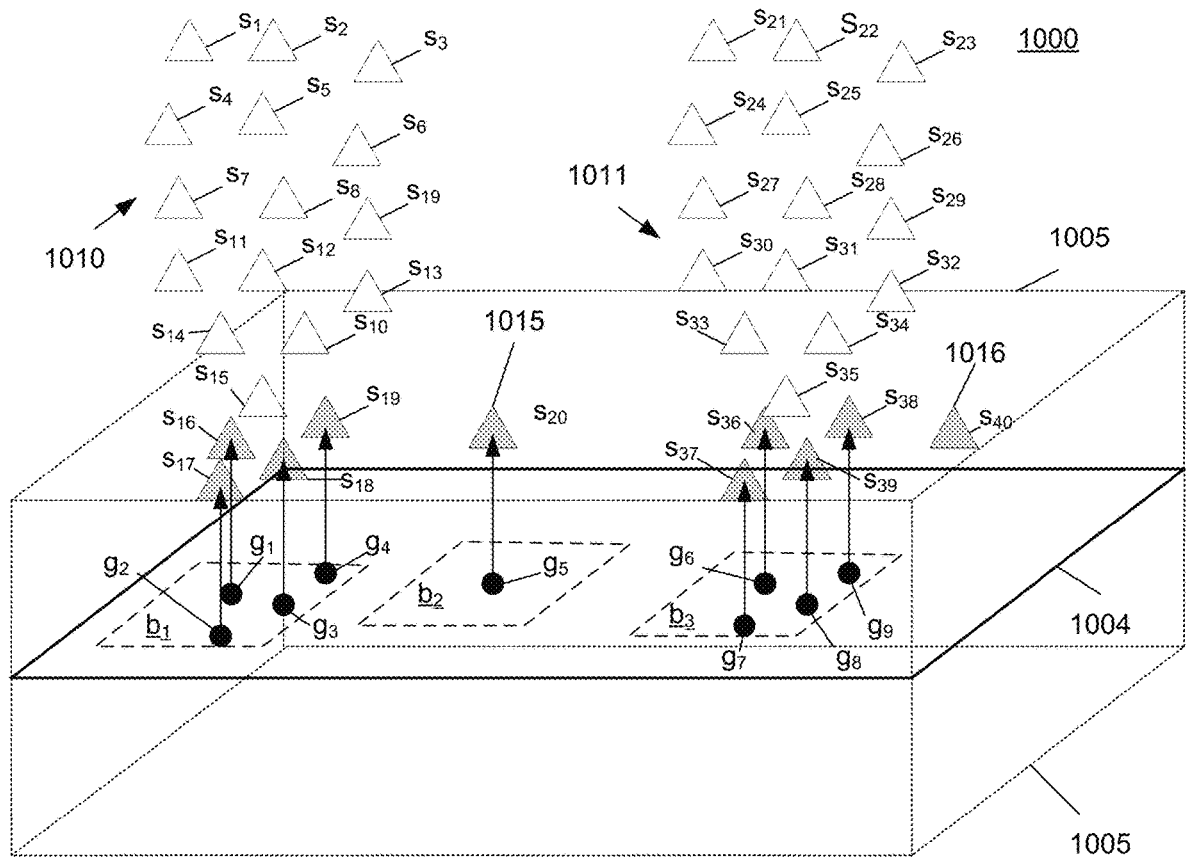
FIGS. 10A, 10B, 10C, 10D, 10E, and 10F illustrate an example of the interaction process of FIG. 9 to a virtual 3D environment.

FIG. 10A shows a touch panel primitive 1001. The primitive may be a plane primitive 1004 having a force field boundary 1005 of 5 cm and a charge of 0. In addition, the lines forming the outer perimeter of the plane may be implemented with the line primitives having a force field boundary of 1 cm to 2 cm and charge of +10 allowing the position and orientation of the plane primitive to be moved, positioned, and oriented within the 3D space using a force application (e.g., as described above in connection with FIGS. 1-7 (and not depicted in the example shown in FIGS. 10A-10F). Content (e.g., a web page) may be rendered in the plane associated with the core of the plane primitive at a position corresponding to the position of the plane within the 3D virtual space to provide a touch panel webpage interface implementation.

At a time $t_0$ there is no sensor input and a gesture input list has no elements. At time $t_1$, an input frame from one or more depth sensors is received corresponding to the input illustrated in FIG. 10A. As shown in FIG. 10A, two point clouds 1010 (e.g., $\{s_1\text{-}s_{19}\}$), 1011 (e.g., $\{s_{21}\text{-}s_{39}\}$) are shown, which are associated with the sensor input corresponding to two fingers of a user (e.g., a thumb and index finger of the same hand), and random points 1015 (e.g., $s_{20}$), 1016 (e.g. $s_{40}$) associated with a noise input from the sensor (e.g., infra-red reflectance detected by the sensor from the environment around the user's hand). Four points from point cloud 1010 (e.g., $\{s_{16}\text{-}s_{19}\}$), four points from point cloud 1011 (e.g., $\{s_{36}\text{-}s_{39}\}$) and the points 1015 (e.g., 520), 1016 e.g. $s_{40}$) associated with noise are within the force field boundary 1005 of the plane primitive of the virtual touch panel element.

The points within the boundary are back-projected onto the plane associated with the primitive. For example, the shortest distance to the primitive is determined for each sensor input within the field boundary of the primitive. In this example, a line drawn orthogonal to the plane of the primitive and intersecting each of the sensor inputs ($S_{16}$, $S_{17}$, $S_{18}$, $S_{19}$, $S_{20}$, $S_{36}$, $S_{37}$, $S_{38}$, $S_{39}$, and $S_{40}$) is determined. A corresponding point is back-projected onto the plane associated with the primitive at the point where each orthogonal line interests the primitive (e.g., $g_1$, $g_2$, $g_3$, $g_4$, $g_5$, $g_6$, $g_7$, $g_8$, $g_9$, $g_{10}$), and a weighted vector is determined for each back projected point. The back-projected points are then filtered to remove poorly weighted points. For example, the weight w for the back projected point $g_{10}$ associated with input 1016 is below a threshold, determined to be noise, and is removed.

The primitive is then scanned for all the remaining back projected points and the points are grouped into clusters. Scanning from left to right, bottom to top, a point $g_1$ is located first. In this example, a cluster box for the interface is set to a box having dimensions 3 cm×3 cm. A first box $b_1$ is assigned to the point $g_1$, and cluster ID B1 is generated and added to the cluster list. The primitive is scanned to determine any other back-projected points that are within the 3 cm×3 cm box surrounding the point $g_1$. In this example, additional back-projected points $g_2$, $g_3$ and $g_4$ are determined to be within the box, and points $g_1$, $g_2$, $g_3$ and $g_4$ are stored in association with unique ID B1 in the cluster list.

The scanning continues, determining clusters ID B2 for box $b_2$ with point $g_5$, and ID B3 for box $b_3$ with points $g_6$, $g_7$, $g_8$, and $g_9$. The boxes $b_1$-$b_3$ are filtered. For example, the box $b_2$ is determined to include a single point and is eliminated as noise and the ID B2 is deleted from the list.

Figure 10B:
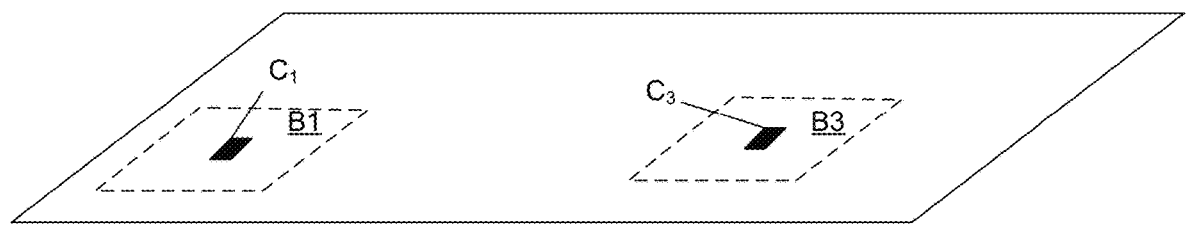

For the remaining boxes $b_1$ and $b_3$, centroids $c_1$ and $c_2$ are determined as shown in FIG. 10B. The positions of the centroids are stored in a cluster list associated with the IDs B1 and B3 respectively. After $t_1$, the cluster list is shown in table 1:

| B1 | $c_1 (x_1, y_1)$ |
|---|---|
| ~~B2~~ | ~~$c_2$~~ |
| B3 | $c_3 (x_3, y_3)$ |

Figure 10C:
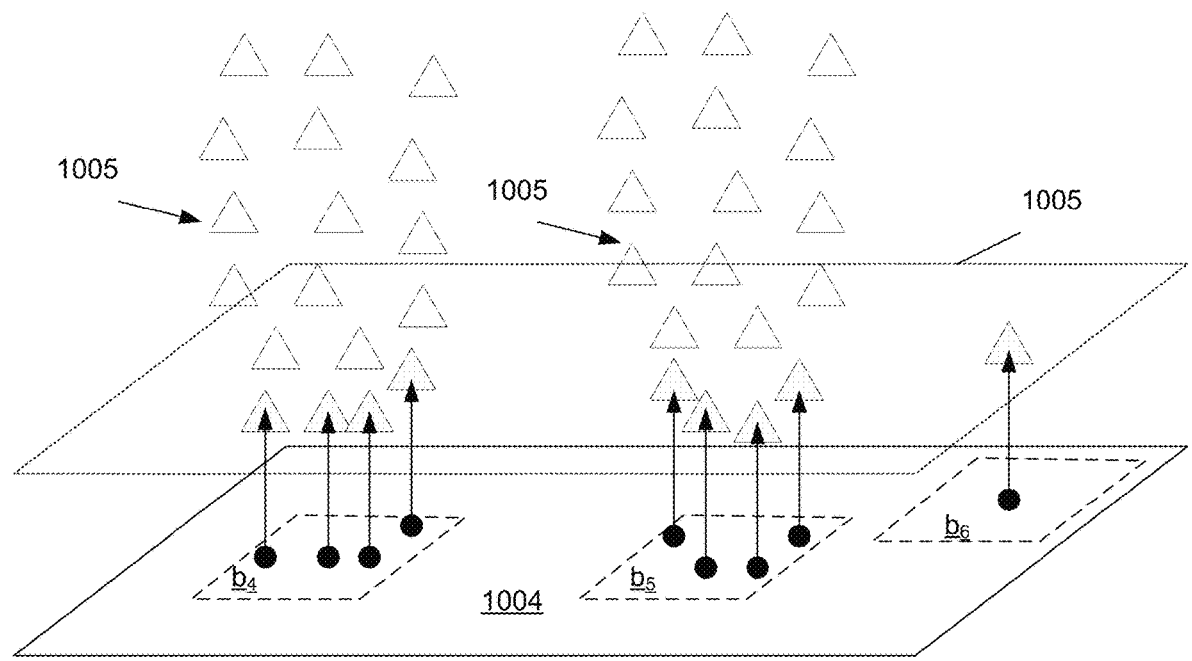
Figure 10D:
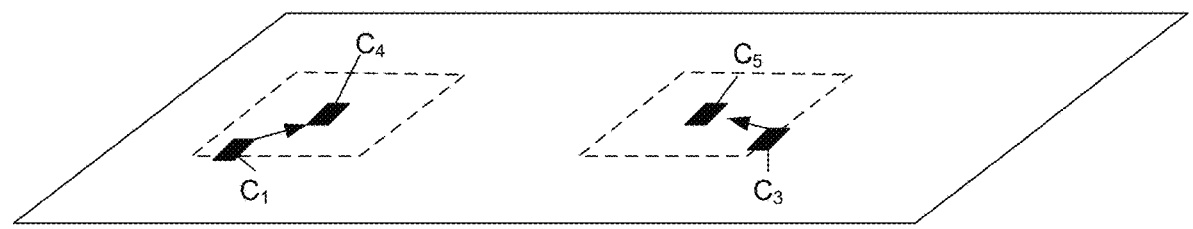

At time $t_2$, an input frame from the one or more depth sensors is received corresponding to the input illustrated in FIG. 10C. The process is repeated, resulting in new IDS B4 and B5 for the new input points resulting boxes $b_4$ and $b_5$ with centroids $c_4$ and $c_5$, as shown in FIG. 10D. At this point the cluster list is shown in table 2:

| | |
|---|---|
| B1 | $c_1 (x_1, y_1)$ |
| B3 | $c_3 (x_3, y_3)$ |
| B4 | $c_4 (x_4, y_4)$ |
| B5 | $c_5 (x_5, y_5)$ |
| ~~B6~~ | ~~$c_6$~~ |

However, the distance between $c_1 (x_1, y_1)$ and $c_4 (x_4, y_4)$ and the distance between $c_3 (x_3, y_3)$ and $c_5 (x_5, y_5)$ is less than the size of a bounding box (e.g., 3 cm×3 cm). Therefore, it is determined that these centroids are part of the same cluster, and their unique IDs are removed and their positions added to unique IDs B1 and B3 respectively, as shown in Table 3:

| | |
|---|---|
| B1 | $c_1 (x_1, y_1), c_4 (x_4, y_4)$ |
| B3 | $c_3 (x_3, y_3), c_5 (x_5, y_5)$ |

Figure 10E:
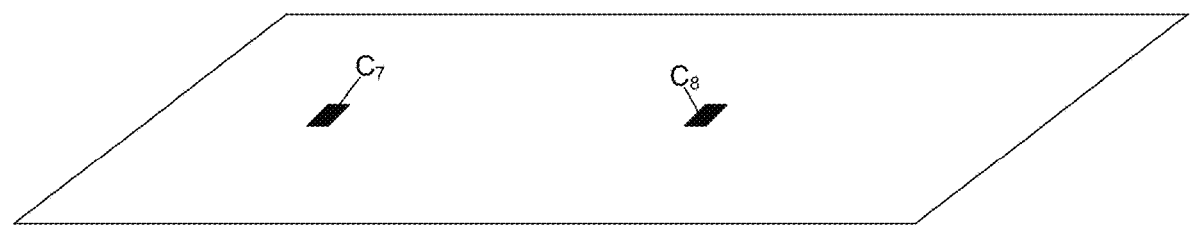
Figure 10F:
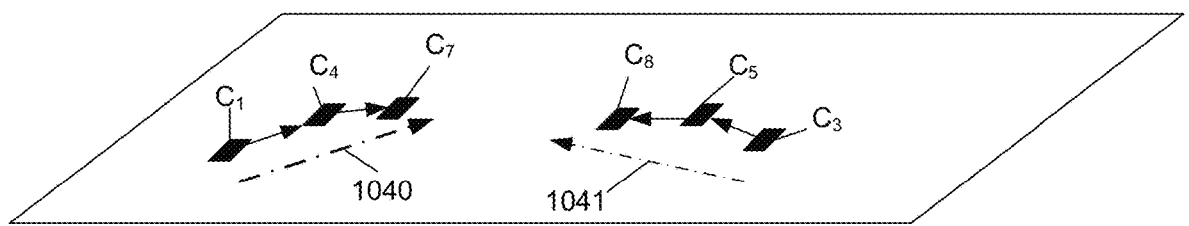

Similarly, at time $t_3$, centroids c7 and c8 for unique IDs B7 and B9 are determined as shown in FIG. 10E. However, the distance between $c_4 (x_4, y_4)$ and $c_7 (x_7, y_7)$ and the distance between $c_5 (x_5, y_5)$ and $c_8 (x_8, y_8)$ are less than the size of a bound box. Therefore, it is determined that these centroids are part of the same cluster and their unique IDs are removed and their positions added to unique IDs B1 and B3 respectively, as shown in Table 4:

| | |
|---|---|
| B1 | $c_1 (x_1, y_1), c_4 (x_4, y_4), c_7 (x_7, y_7)$ |
| B3 | $c_3 (x_3, y_3), c_6 (x_6, y_6), c_8 (x_8, y_8)$ |

As the points are added to the table and the table is processed and filtered, the data from the table is continually input to a gesture algorithm or engine to determine if an event is triggered (e.g., through the execution of a recognized "gesture"). In this example, at $t_3$, it is determined that the centroid locations for each unique ID indicate that locations forming two lines 1040, 1041 moving towards each other over a sufficient distance, for example, as shown in FIG. 11F, to trigger a pinch to zoom event causing the content associated with the plane primitive 1004 to zoom out. As a result, the content is resized in rendering on the virtual panel.

The above-described manipulation of computer-generated elements in a virtual 3D space—based on, for example, input translated from the real world 3D point data observed by at least one sensor and various interfaces—may be implemented as part of an overall virtual 3D space interface and combined therein with other tools for manipulating the 3D space. For example, a gesture-based interface may be used in conjunction with a force-based system for manipulation of virtual elements (as described above). For example, in a gestured based interface, the point cloud may be processed to determine one or more gestures corresponding to the movement of the point cloud. In this example, a recognized gesture may be used to manipulate a virtual element when the point cloud is outside the force field of a virtual element. For example, when the point cloud acts in a predetermined manner, for example, hovering in proximity to a virtual element outside of the virtual elements force field, the point cloud may be observed to determine a gesture. For example, movement of the point cloud is processed to determine a "grab" gesture (e.g., corresponding to opening and closing of a hand). The grab gesture may be used to select or grasp a virtual element in the virtual 3D space. Once grasped, the virtual element may be interacted with and manipulated (e.g., moved, repositioned, activated, and/or the like). In the same example, when the point cloud enters the force field of the virtual element, the virtual element may be manipulated based on calculated forces and the primitives of the virtual element. In this manner, a virtual element may be manipulated based on a gesture based input or a force based determination. One example of a gesture-based interface is described in U.S. patent application Ser. No. 14/147,199, titled "Extramissive Spatial Imaging Digital Eye Glass Apparatuses, Methods and Systems for Virtual or Augmediated Vision, Manipulation, Creation, or Interaction with Objects, Materials, or Other Entities," filed Jan. 3, 2014, which is incorporated herein by reference in its entirety.

System Components

Figure 11:
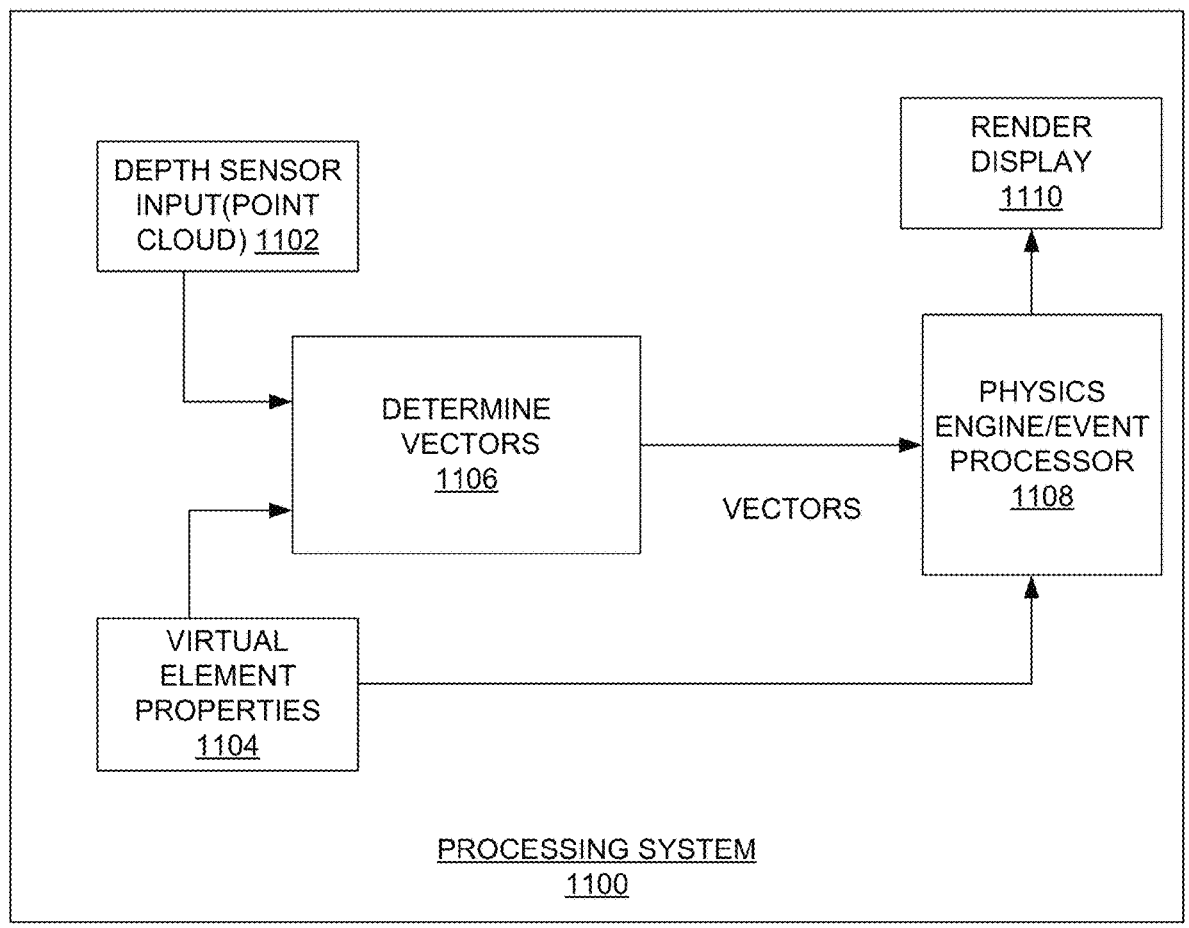
FIG. 11 shows a block diagram illustrating basic components of a processing system for interaction with a virtual 3D environment.

FIG. 11 shows a block diagram illustrating example components of a processing system 1100, in accordance with some implementations. The processing system 1100 may include a depth sensor input system 1102, a virtual element properties system 1104, a vector determination system 1106, a physics engine/event processor 1108, and a display rendering system 1110. One or more of the elements of the processing system 1100 may correspond to one or more of the elements of the virtual environment management system 1200, shown in FIG. 12, and described in greater detail below.

In some implementations, inputs from a depth sensor input system 1102 and parameters for a virtual element provided to the virtual element properties system 1104 may be input to the vector determination system 1106. In various implementations the vector determination system 1106 may implement one or more of the vector determinations derived by the process 600 shown in FIG. 6, the process 700 shown in FIG. 7, the process 900 shown in FIG. 9 The vectors determined by the vector determination system 1106 along with the parameters are inputs to the physics engine/event processor 1108 (which may comprise physics engine(s), event engine(s), gesture engine(s), and/or any other defined logic to determine events and render of content associated with a virtual element within a 3D virtual environment based on the input from the sensors). The data may be output to another program or application to cause rendering of the content associated with an event for viewing by a user. For example, the output may be provided to the display rendering system 1110 for rendering in a display or other visual output device. In this manner, input corresponding to real world objects may be used influence and manipulate virtual elements using a charge and interaction volume.

Figure 12:
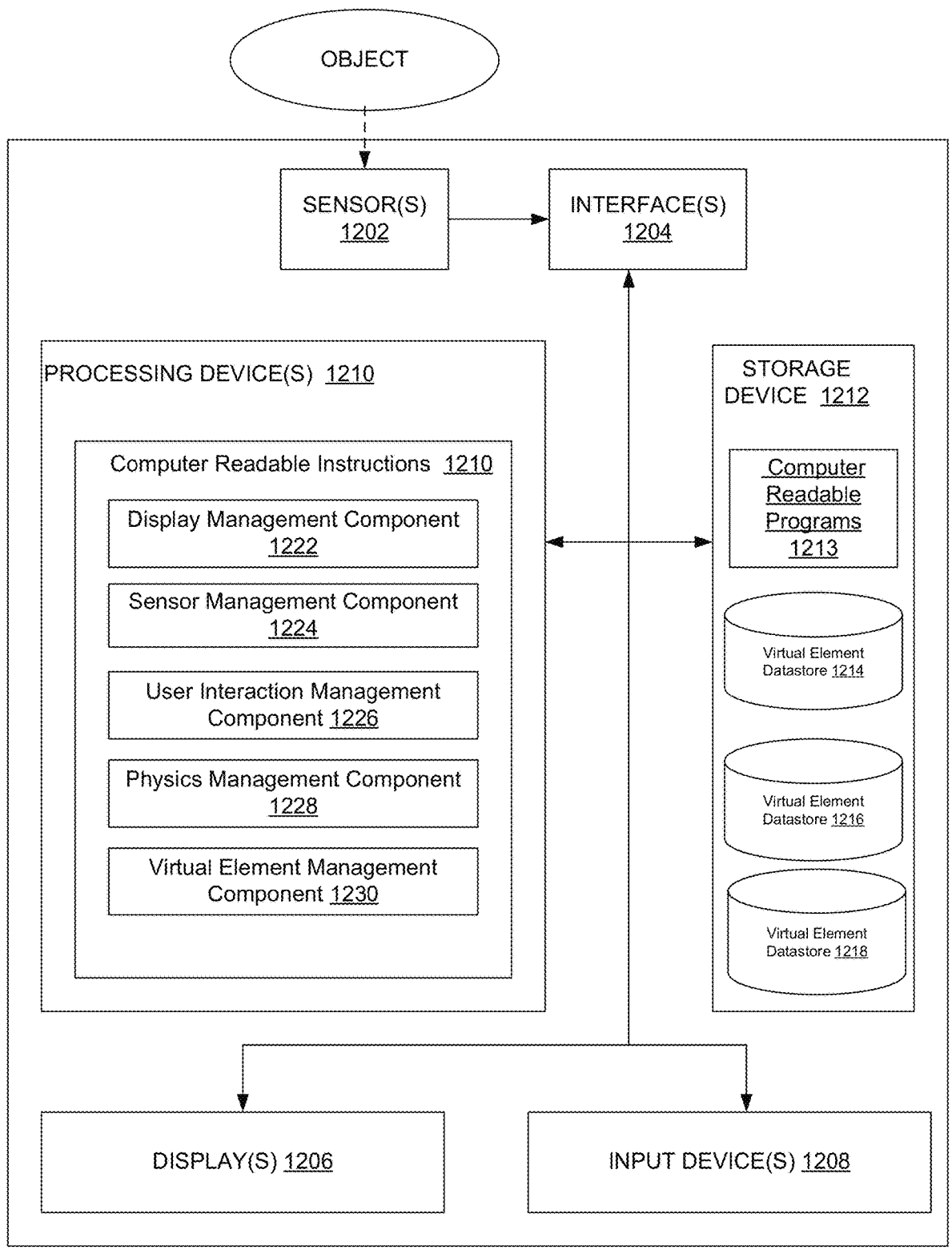
FIG. 12 shows a block diagram illustrating some basic components of a system for manipulation a virtual element.

FIG. 12 illustrates an example of a block diagram for a virtual environment management system 1200, in accordance with one or more implementations described herein. The virtual environment management system 1200 may include sensor(s) 1202, interface(s) 1204, display(s) 1206, input device(s) 1208, one or more processing devices 1210, and one or more storage devices 1212. The storage devices may include one or more datastores, including a virtual element datastore 114, a primitive datastore 116, a user interaction datastore 118, and/or other datastores. One or more of the components shown in FIG. 12 may be coupled to one another or to components not explicitly shown in FIG. 1.

The sensor(s) 1202 may be configured to detect user input. The sensor(s) 1202 may include one or more devices that obtain data about a physical property (light, motion, velocity, distance, sound, heat, pressure, magnetism, etc.) in the physical world and provide one or more components of the virtual environment management system 1200 with a signal that represents the data. In an implementation, the sensor(s) 1202 include a motion sensor that senses movement of a user or of a component of the virtual environment management system 1200. The sensor(s) 1202 may also include an Inertial Measurement Unit (IMU), an accelerometer, a gyroscope, etc. that senses translational and/or rotational motion by a user or of a component of the virtual environment management system 100. In some implementations, the sensor(s) 1202 include a camera that gathers images of a physical environment surrounding a user or a component of the virtual environment management system 1200. The camera may comprise a still camera that captures still images of the physical environment or a motion camera that captures videos or other motion pictures of the physical environment. In various implementations, the sensor(s) 1202 comprise a depth-camera. A "depth-camera," as used herein, may refer to a device or a component that has the capability to capture still and/or moving images, and has the ability to sense distances of objects away from it.

In various implementations, the sensor(s) 1202 may form a part of a Virtual Reality (VR) system that senses the physical environment around a user. In these VR implementations, the sensor(s) 1202 may include accelerometers, gyroscopes, etc. that provide movement data related to how a user is moving; the movement data may be used as the basis of perspectives, etc. used in a virtual environment managed by the VR system. In one or more examples described herein, a "virtual environment," may refer to a virtual space that represents an environment, real or imaginary, and simulates a user's presence in a way that allows the user to interact with the environment. The virtual environment may include "virtual elements" as described herein.

Moreover, in some implementations, the sensor(s) 1202 may form a part of an Augmented Reality (AR) system that uses a virtual environment, virtual elements, and/or synthetic images/objects to augment a physical environment to create an augmented, and/or "mixed reality", environment. An "augmented environment," as used herein, may refer to a space that represents a virtual environment that is superimposed over a perspective of a physical environment around a specific user. An augmented environment may include attributes of a virtual environment, including virtual elements superimposed over portions of the physical environment. In some implementations, an augmented environment may represent physical objects in the physical world as virtual elements in the augmented environment. The virtual elements may, but need not, appear to a user to be different from the physical objects that the virtual elements correspond to in the virtual environment. As an example, a virtual element representing a computer screen in an augmented environment may have the same size dimensions, etc., as the physical object (i.e., the computer screen); however, the virtual element may also have different size dimensions, etc., than the physical object.

In VR and/or AR implementations, the sensor(s) 1202 may include IMUs, accelerometers, gyroscopes, etc., that provide movement data related to how a user is moving; the movement data may be used as the basis of perspectives, etc. used in the virtual or augmented environment. Further, in an AR implementation, the sensor(s) may comprise or include a depth-camera used in an AR system to capture still and/or moving images of the physical environment and to provide distances of objects away from the depth-camera for processing and use in the AR environment.

As described above, one or more virtual elements may move within the virtual environment. For example, one or more virtual elements may move within the virtual environment in response to one or more forces applied to virtual element(s) as described above. The forces applied to virtual element(s) may include one or more of forces described herein and/or other forces.

The interface(s) 1204 may comprise any computer-readable medium that couples the other components of the virtual environment management system 1200 to one another. In some implementations, at least a portion of the interface 1204 includes a bus or other data conduit or data plane. In these implementations, at least two components of the virtual environment management system 1200 are co-located on a single digital device. Further, in various implementations, at least a portion of the interface 1204 includes a computer network or a part of a computer network. In these implementations, at least two components of the virtual environment management system 1200 are located on different digital devices that are coupled to one another by the computer network. It is noted that the computer network may include a wireless, a wired back-end network, or a Local Area Network (LAN). In some implementations, the computer network encompasses a relevant portion of a Wide Area Network (WAN) and/or other network.

The display(s) 1206 may include one or more devices that display images and/or other data to a user. In some implementations, the display(s) 1206 are implemented using Cathode Ray Tube (CRT), Plasma Display, Liquid Crystal Display (LCD), Light Emitting Diode (LED) technologies, and/or fiber optic projector systems. The display(s) 1206 may be configured to display a virtual environment, either alone (in replacement of the real world environment) or in an augmented environment. In some implementations, the display(s) 1206 displays virtual elements, interactions with virtual elements, etc. In some implementations, the display(s) 1206 comprise at least a portion of the input device(s) 108 as discussed further herein.

The virtual environment management system 100 may, but need not, include one or more input device(s) 1208. The input device(s) 1208 may include one or more devices that receive/detect user input from a user. The input device(s) 1208 may comprise physical keyboards, joysticks, mice, trackpads, other peripherals, and/or portions of a touchscreen display. As an example, the input device(s) 1208 may, in some implementations, comprise portions of touchscreen displays that facilitate and/or initiate interactions with virtual environments supported by the systems and methods herein. In some implementations, one or more sensor(s) 1202 may be carried (e.g., attached to, supported, held, disposed on, and/or otherwise carried) by one or more input device(s) 1208.

The processor devices 1210 may be configured to provide information processing capabilities in the virtual environment management system 1200. In some implementations, the processor devices 1210 may include one or more of a digital processor, an analog processor, a digital circuit designed to process information, an analog circuit designed to process information, a state machine, and/or other mechanisms for electronically processing information, as described below.

Although the processor device 1210 is shown in FIG. 12 as a single entity, this is for illustrative purposes only. In some implementations, processor devices 1210 may include a plurality of processing units (e.g., a plurality of CPUs and/or GPUs). These processing units may be physically located within the same device, or processor devices 1210 may represent processing functionality of a plurality of devices operating in coordination. The processor devices 1210 may be configured to execute one or more computer-readable instructions 1240. In some implementations, the processor devices 1210 are configured to execute the computer-readable instructions 1240 by software, hardware, firmware, or some combination of software, hardware, and/or firmware; and/or other mechanisms for configuring processing capabilities on processor devices 1210.

The computer-readable instructions 1240 may include a display management component 1222, a sensor management component 1224, a user interaction management component 1226, a physics system management component 1228, a virtual element component 1230, in addition to other computer-readable instructions components (e.g., operating systems, drivers, applications, and other software components). The computer-readable instructions also may be stored in a one or more non-transitory storage devices 1212 that are accessed by the one or more processing devices 1210 to load and execute the components. It also should be appreciated that although the components 1222, 1224, 1226, 1228, and 1230 are illustrated in FIG. 1 as being executed by a single processing unit (e.g., the process device(s) 1210), in implementations in which processing device(s) 1210 includes multiple processing units, one or more of the components may be located remotely from the other components. In addition, the description of the functionality provided by the components 1222, 1224, 1226, 1228, and 1230 described herein is for illustrative purposes, and is not intended to be limiting, as any of the components 1222, 1224, 1226, 1228, and 1230 may provide more or less functionality than is described. For example, one or more of the components 1222, 1224, 1226, 1228, and 1230 may be eliminated, and some or all of its functionality may be provided by other ones of the components 1222, 1224, 1226, 1228, and 1230 or a different component. For example, processing device(s) 1210 may be configured to execute one or more additional components that may perform some or all of the functionality attributed herein to one of components 1222, 1224, 1226, 1228, or 1230.

In some implementations, the computer-readable instructions 1240 provide instruction to operate one or more applications including an operating system, a virtual 3D environment application, a physics engine and/or a user interaction engine (e.g., if not included in the 3D environment application, various drivers (e.g., for the interfaces and communications of the system) in addition to other programs, for example, a browser application.

The display management component 1222 may include computer-readable instructions configured to manage the display(s) 1206. The display management component 1222 may include instructions to effectuate display of the virtual environment, including one or more virtual elements, on the display(s) 1206. The virtual environment may be displayed on the display(s) 1206 so that the virtual element(s) appear to move in response to one or more forces applied to the virtual element(s). For example, the virtual environment may be displayed so that one or more virtual elements appear to move in response to one or more of forces described herein (e.g., a user-applied force) and/or other forces.

In some implementations, the display management component 1222 includes instructions for addressing portions of the display(s) 1206 to display specific aspects of a virtual environment, either alone, or as part of an augmented environment. For example, the display management component 1222 may include instructions to address specific pixels of the display(s) 1206 with specific colors, images, virtual elements, etc. that are provided to the user as part of a virtual environment. In various implementations, the display management component 1222 selects specific colors, images, virtual elements, etc. based on attributes of the physical environment. In various implementations, the display management component 1222 also selects specific colors, images, virtual elements, etc. based on a state of a virtual environment and/or user interactions taken (e.g., user interactions taken on virtual elements).

The sensor management component 1224 may include computer-readable instructions configured to manage the sensor(s) 1202. The sensor management component 1224 may be coupled to graphics processing hardware, software, and/or firmware for processing images, and/or other hardware, software, and/or firmware for processing other forms of sensor data. In various implementations, the sensor management component 1224 obtains image, depth, and/or other data from the sensor(s) 1202 and extracts image information, depth and/or other positional information, etc. from the data. The sensor management component 1224 may provide the extracted information to the physics system management component 2128 and/or other components of the virtual environment management system 1200.

The user interaction management component 1226 may include computer-readable instructions configured to manage user interactions from devices that can receive/detect user interactions, including but not limited to the sensor(s) 1202, input device(s) 1208, and/or other devices coupled to the virtual environment management system 1200. A user interaction may refer to one or more actions of a user directed towards the virtual environment and/or one or more virtual elements. A user interaction may be received at a time, over a course of time, at a location, or over a range of locations. In some implementations, the user interaction management component 1226 is coupled to peripheral processing hardware, software, and/or firmware that manages the devices that receive/detect user interactions. The user-interaction management component 1226 may determine one or more user interactions with one or more virtual elements based on user input (e.g., received via the sensor(s) 1202 and/or the input device(s) 1208, etc.).

The user interaction management component 1226 may provide to the physics system management component 1228 any user interaction data that is based on user input into the devices that receive/detect user interactions. "User interaction data," as discussed herein, may refer to user input into the devices that receive/detect user interactions, the input allowing a user to interact with at least a portion of a virtual environment supported by the virtual environment management system 100. In some implementations, the user interaction data comprises interactions with at least portions of a virtual environment, such as interactions with virtual elements in a virtual environment. The virtual environment may, but need not, be incorporated in an augmented environment, as discussed further herein.

In some implementations, the user interaction data managed by the user interaction management component 1226 may be based on sensor data from the sensor(s) 1202 and/or managed by the sensor management component 1224. The sensor data may be based on images taken, e.g., by a still or motion camera coupled to and/or implemented by the sensor(s) 1202. The sensor data may be based on depth points (e.g., points along a line orthogonal to the sensor(s) 1202 taken by a depth-sensor coupled to and/or implemented by the sensor(s) 1202. In various implementations, the sensor data is taken from gyroscopes, accelerometers, and/or other motion sensors coupled to and/or implemented by the sensor(s) 1202.

In various implementations, the user interaction management component 1226 identifies portions of the virtual environment that correspond to specific user interactions. The user interaction management component 1226 may identify where sensor data obtained from the sensor(s) 1202 and/or managed by the sensor management component 1224 is to be projected into a virtual environment managed by the virtual environment management system 1200. As examples, the user interaction management component 1226 may identify if/whether specific gestures are related to known virtual points, etc. in the virtual environment. The user interaction management component 1226 may further identify whether these virtual points correspond to locations of virtual elements, etc. in the virtual environment. In various implementations, the user interaction management component 1226 may modify a state, a property, etc. of a virtual element, etc. based on one or more user interactions. The user interaction management component 1226 may, for instance, modify an interactive volume of a virtual element based on user interaction data.

The physics system management component 128 may include computer-readable instructions configured to manage a physics system for a virtual environment supported by the virtual environment management system 1200. A "physics system," as used herein, may refer to a set of rules that govern physical relationships of virtual elements in the virtual environment. In some implementations, the physics system implemented by the physics system management component 1228 may implement rules for force determination in the virtual environment, rules to select and/or manage primitives that form the basis of virtual elements in the virtual environment, rules to define interactive volumes of virtual elements in the virtual environment, and/or rules that allow for and/or define manipulation of virtual elements in the virtual environment, as described in detail above.

For example, in some implementations, the physics system management component 1228 implements force determinations for virtual elements in a virtual environment. In various implementations, the physics system management component 1228 implements force determinations on these virtual elements based on rules assigned to those virtual elements and/or user interaction data from the user interaction management component 1226.

One example of the types of force determinations that may be applied includes force determinations based on virtual electromagnetic forces between virtual elements in the virtual environment. Though the discussion herein discusses force determinations based on virtual electromagnetic forces (e.g., on Coulomb's Law) in greater detail, it is noted that the physics system management component 1228 may determine virtual forces between virtual elements based on any virtual physical forces and/or other forces, including but not limited to virtual gravitational forces, virtual thermodynamic forces, virtual chemical forces, virtual atomic weak forces, virtual atomic strong forces, etc. consistent with the embodiments described herein.

In addition, physics system management component 1228, the physics system management component 1228 provide for manipulation of virtual elements using the processes described above with regard to FIGS. 6, 7, and 9.

In some implementations, the physics system management component 1228 may access a data file in the primitive datastore 1216 that contains data relating to primitives corresponding to virtual elements and/or virtual elements. One or more data files or records may store one or more primitives, coordinates, assigned content, and/or graphics corresponding to virtual elements modeled in the 3D virtual environment. In some implementations, the physics system management component 1228 implements interactivity using one or more of the primitive as discussed herein.

The physics system management component 1228 provides for determination and application of one or more forces to virtual elements. One or more forces applied to virtual elements may include a user-applied force. The physics system management component 128 may enable movement of the virtual element in response to forces applied to the virtual element. A user-applied force may refer to a force applied to a virtual element in response to one or more user interactions with the virtual element. A user-applied force may include one or more linear forces and/or one or more angular forces. A user-applied force may include an attractive force or a repelling force. A user-applied force may include one or more virtual electromagnetic forces and/or other types of forces (e.g., forces associated with properties or constraints of the one or more primitive forming a virtual element). An amount and/or a direction of a user-applied force may be based on one or more user-interactions. The amount and direction of user-applied force may be determined based on user interaction. An amount and/or a direction of a user-applied force also may be based the state, properties, or constraints of a virtual element. For example, a virtual element representing an object made of metal may be required to need more force to move as compared with another virtual element representing a feather.

In another example, the amount of force also may be based on motion of the virtual element. For example, when a virtual element is moving and accelerate, more force may be required than when a virtual element is at rest. Moreover, forces may oppose a motion of a virtual element. For example, a drag force may include one or more linear forces and/or one or more angular forces that include one or more forces pushing/pulling a virtual element in a direction opposite from a direction of the motion of the virtual element. An amount of a drag force may be related to a speed (linear and/or angular) of the motion of the virtual element. In some implementations, an amount of a drag force may be proportional to a speed, a squared speed, or other factors of a speed of the motion of the virtual element. In some implementations, an amount of a drag force may simulate air/fluid resistance of the virtual element moving in the virtual environment. The determination of the amount of drag force may include one or more multipliers. The physics system management component 1228 may, responsive to one or more forces (e.g., a user-applied force, a drag force, etc.) applied to a virtual element and/or property or constraint of a virtual element cause motion of the virtual element, apply one or more drag forces to the virtual element. One or more drag forces may oppose a direction of motion of the virtual element.

The physics system management component 1228 may determine a motion of a virtual element within a virtual environment based on one or more forces. For example, physics system management component 1228 may determine a motion of a virtual element based on one or more of a user-applied force, a drag force, and/or other forces. The physics system management component 1228 may sum the forces applied on the virtual element and determine the motion of the virtual element based on the summed force.

The virtual element component 1230 may include computer-readable instructions to identify one or more virtual elements in the virtual environment. One or more virtual elements may be identified based on real world objects and/or based on a program/software running on processing device(s) 1210. For example, virtual elements may be linked to real world objects near a user. Object recognition and/or tracking software may be used to detect and determine locations of one or more real world objects. The virtual elements corresponding to the detected real world objects may be identified and placed within the virtual environment based on the identities and the locations of the real world objects. The processing devices 1210 may be used to run an object modeling application and the virtual element component 1230 may identify one or more virtual elements corresponding to one or more tools, objects, and/or other components of the object modeling application. Other types of virtual elements identification also are contemplated.

The virtual element component 1230 may include computer-readable instructions to obtain one or more virtual properties for one or more virtual elements (e.g., mass, drag, motion, among others). A virtual mass property may define a sensitivity of reaction of a virtual element to applied forces, including a user-applied force and/or other forces. For example, a virtual mass property may define how much force is required to move a virtual element from a static position and/or how quickly the virtual element moves in response to applied force(s). For example, a virtual mass property may define a virtual mass or a virtual density of a virtual element. A virtual element with heavier virtual mass may require a larger force to move the virtual element from a static position than a virtual element with a lighter virtual mass. A virtual element with heavier virtual mass may require a larger force to move the virtual element at a certain speed than a virtual element with a lighter virtual mass. In some implementations, a heavier virtual mass may correspond to a larger virtual momentum and a virtual element with a larger virtual momentum may require greater force (e.g., drag force, etc.) to stop it than a virtual element with a smaller virtual momentum.

The virtual element datastore 1214, the primitive datastore 1216, and the user interaction datastore 1218 may comprise electronic storage media that electronically stores information and data. The electronic storage media may include one or both of system storage that is provided integrally (i.e., substantially non-removable) with virtual environment management system 1200 and/or removable storage that is removably connectable to the virtual environment management system 1200 via, for example, a port (e.g., a USB port, a firewire port, etc.) or a drive (e.g., a disk drive, etc.). The virtual element datastore 1214, the primitive datastore 1216, and the user interaction datastore 1218 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage media may include one or more virtual storage resources (e.g., cloud storage, a virtual private network, and/or other virtual storage resources). The electronic storage media may store software algorithms, information determined by processor(s) 1210, information received from the virtual environment management system 1200, and/or other information that enables the virtual environment management system 1200 to function as described herein.

In an implementation, the virtual element datastore 1214 is configured to store information relating to virtual elements. The primitive datastore 1216 may be configured to store information relating to primitives. The user interaction datastore 1218 may be configured to store information relating to user interaction data.

FIGS. 13A, 13B, 13C, 13D, and 13E show examples of an implementation of the system of FIG. 12 in a head mounted display (HMD) system 1300 to allow manipulation of virtual element within a 3D virtual environment by a user wearing the HMD.

Figure 13A:
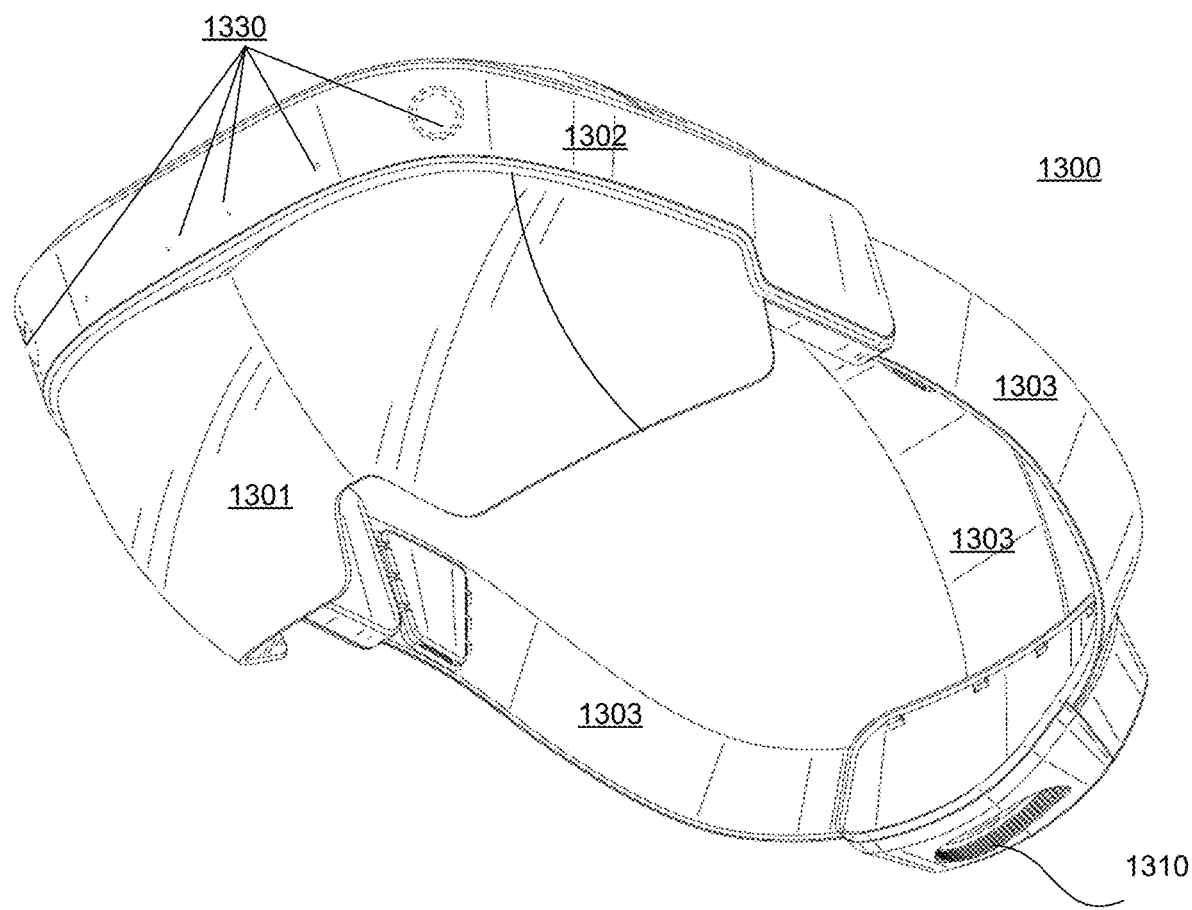
FIGS. 13A, 13B, 13C, 13D, and 13E show examples of a head mounted display implementation of the system of FIGS. 11 and 12.
Figure 13B:
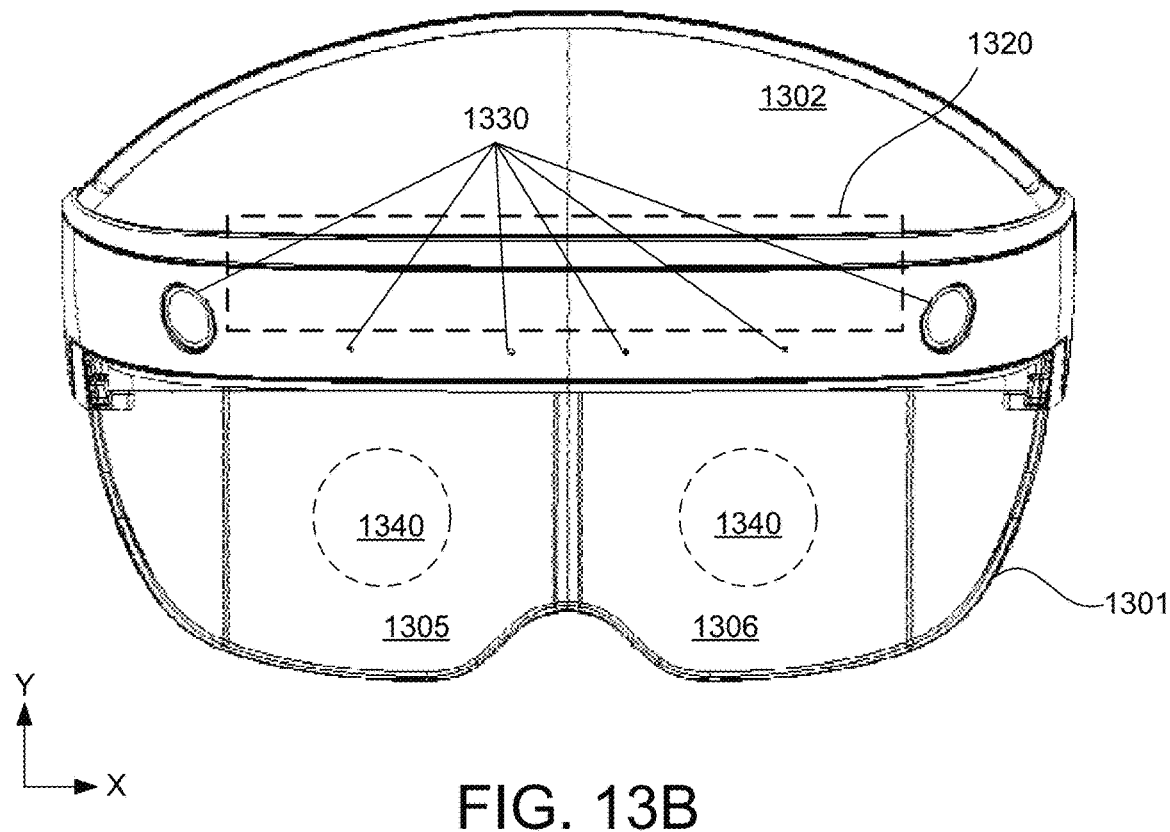
Figure 13C:
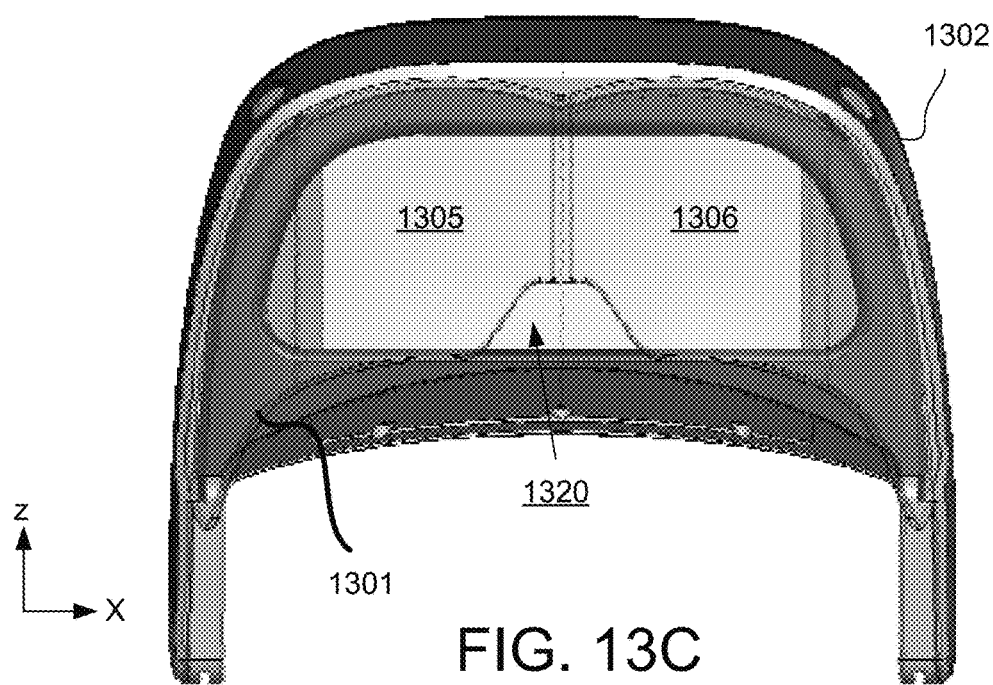

FIGS. 13A, 13B, 13C shows a perspective view, front view, and bottom view, respectively, of one example of an HMD 1300. As shown the HMD includes a visor 1301 attached to a housing 1302, straps 1303, and a mechanical adjuster 1310 used to adjust the position and fit of the HMD to provide comfort and optimal viewing by a user of the HMD 1300. The visor 1301 may include one or more optical elements, such as an image combiner, that includes a shape and one or more reflective coatings that reflect an image from an image source 1320 to the eyes of the user. In one example, the coating is partially reflective allowing light to pass through the visor to the viewer and thus create a synthetic image in the field of view of the user overlaid on the user's environment and provide an augmented reality user interface. The visor 1301 can be made from a variety of materials, including, but not limited to, acrylic, polycarbonate, PMMA, plastic, glass, and/or the like and can be thermoformed, single diamond turned, injection molded, and/or the like to position the optical elements relative to an image source and eyes of the user and facilitate attachment to the housing of the HMD.

In one implementation, the visor 1301 may include two optical elements, for example, image regions 1305, 1306 or clear apertures. In this example, the visor 1301 also includes a nasal or bridge region, and two temporal regions. Each image region is aligned with the position 1340 of one eye of a user (e.g., as shown in FIG. 13B) to reflect an image provided from the image source 1320 to the eye of a user of the HMD. A bridge or nasal region is provided between the two image regions to connect the two regions 1305 and 1306. The image regions 1305 and 1306 mirror each other through the y-z plane that bisects the nasal rejoin. In one implementation, the temporal region extends to an outer edge of the image region wrapping around the eyes to the temple housing of the HMD to provide for peripheral vision and offer support of the optical elements such that the image regions 1305 and 1306 do not require support from a nose of a user wearing the HMD.

Figure 13D:
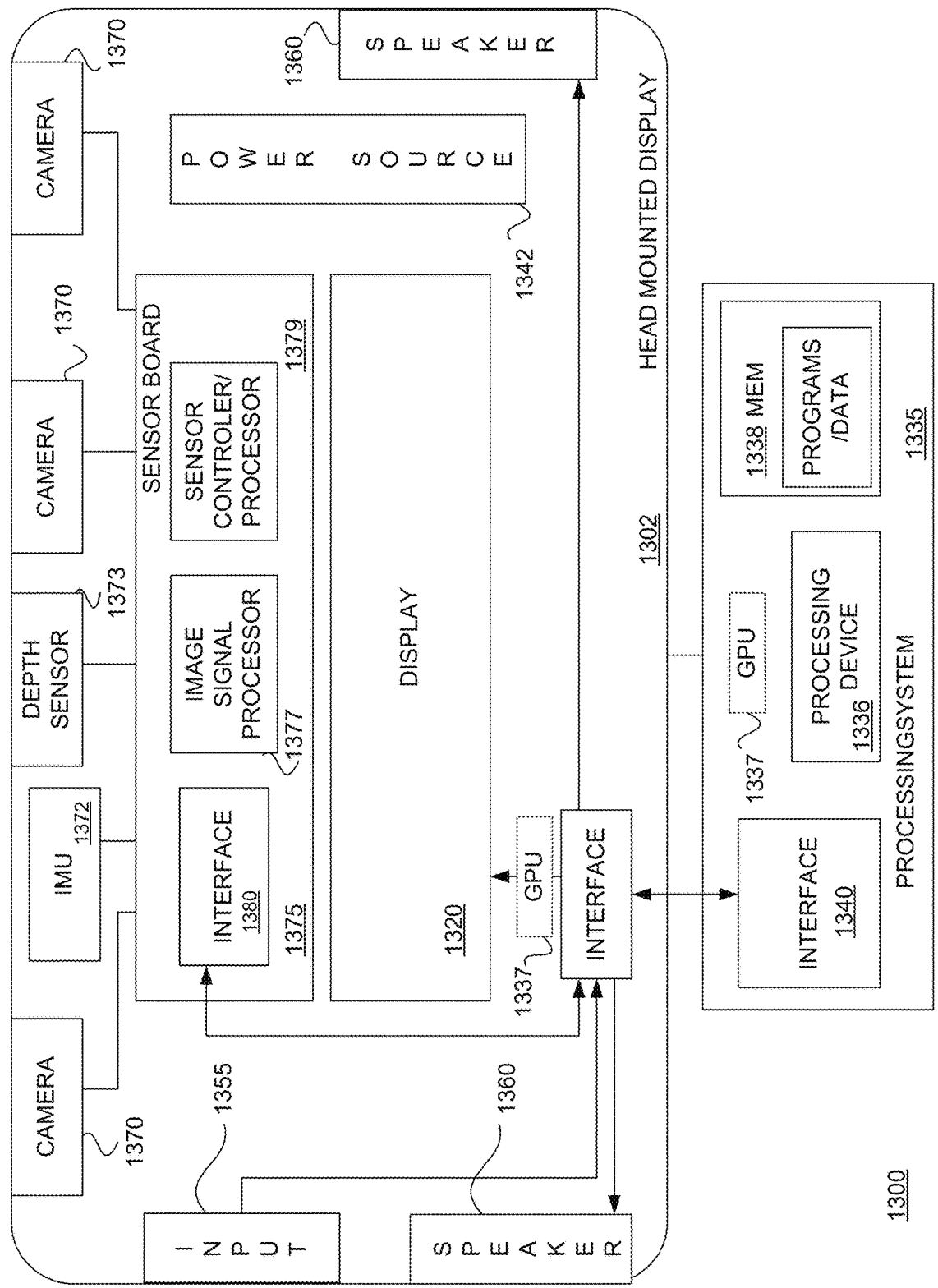
Figure 13E:
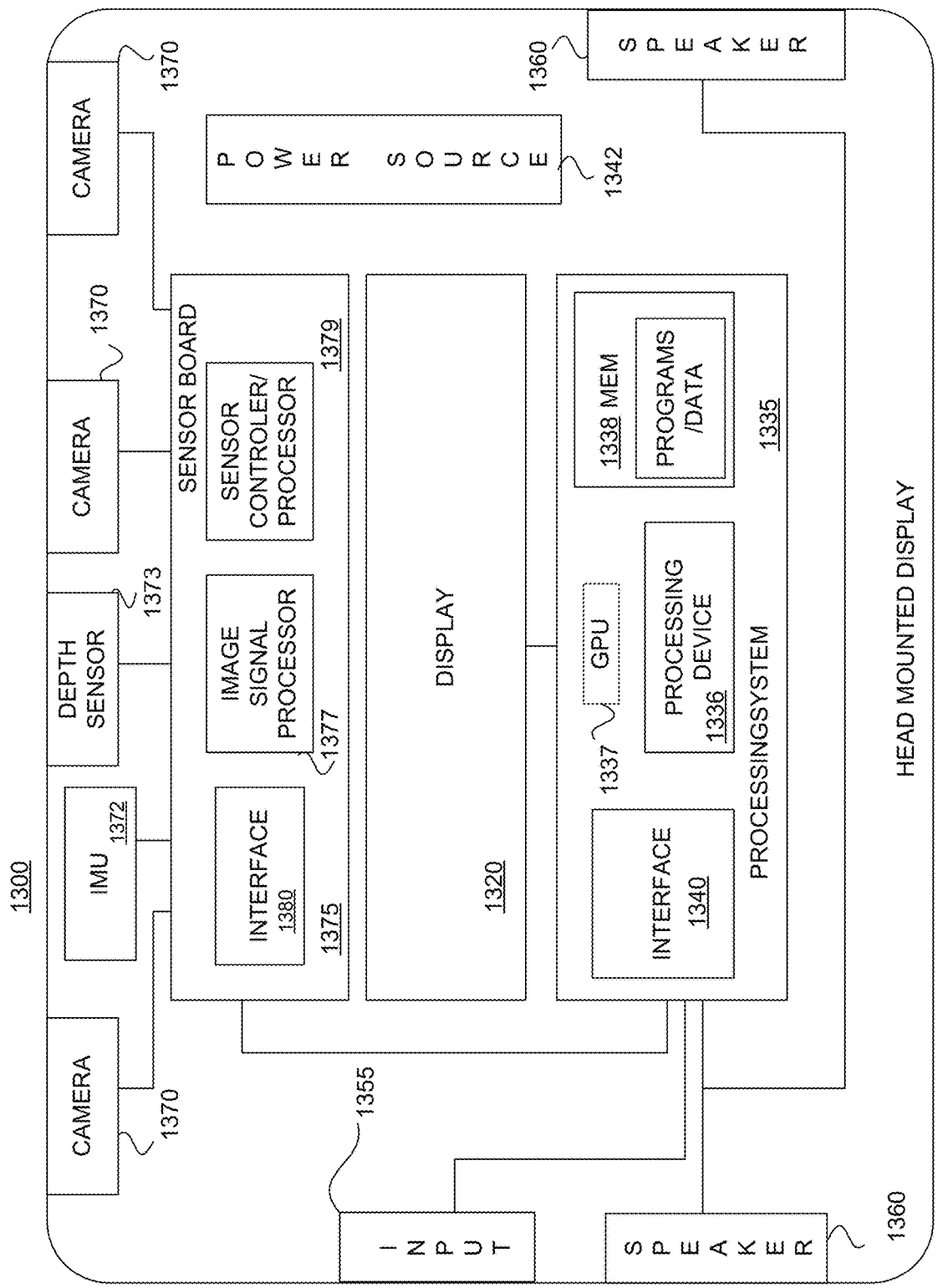

In one implementation, the housing may include a molded section to roughly conform to the forehead of a typical user and/or may be custom-fitted for a specific user or group of users. The housing may include various electrical components of the system, such as sensors 1330 and a display 1320. The HMD also may include a processing system 1335. The processing system may include a processing device 1336, and graphics processing unit (GPU) 1337, a memory 1338, and interface 1340. The processing system 1335 may control operations of the HMD such as displaying/rendering images on the display device, processing sensor information from the sensor array, and manipulating the various system components. FIG. 13D shows an example of an implementation in which the processing system 1335 is implemented outside of the housing 1302 and connected to components of the HMD using an interface 1345 (e.g. a wireless interface, such as Bluetooth or a wired connection, such as a USB wired connector). FIG. 13E shows an implementation in which the processing system 1335 is implemented inside of the housing 1302. As shown in FIG. 13D the graphics processing unit may be implemented as part of the processing device or separately in the housing 1302.

The HMD 1300 also includes a power source 1342 (e.g., such as a battery, power interface, or power supply) to provide power to the HMD components. Various inputs 1355 (e.g., buttons and controls) and outputs 1360 (e.g., speakers) are provided to allow user input control signals to the HMD 1300 and provide output signals (e.g., audio, music, sound effects, among others) from the HMD 1300.

The housing 1302 positions one or more sensors 1330 that detect the environment around the user. In one example, one or more depth sensors are positioned to detect objects in the user's field of vision. The housing also positions the visor 1301 relative to the image source 1320 and the user's eyes. In one example, the image source 1320 may be implemented using one or more displays. For example, the image source may be a single display. If an optical element 1305, 1306 of the visor is provided for each eye of a user, the display may be partitioned into at least two halves. For example, each half may display an image intended for a separate eye. In another example, two displays may be provided. In this example, each display is paired with a corresponding optical element or image area, where each pair provides an image to an eye of the user. Examples of displays include a liquid crystal display (LCD), a Light Emitting Diode (LED) display, a flexible organic LED (OLED) display, and a Liquid Crystal on Silicon (LCoS or LCOS). In one example, a single 4.5- to 5.2-inch diagonal Liquid Crystal Display (LCD) may be used. In another example, dual 2.8-3.4-inch diagonal LCDs, one for each eye, may be used.

In one implementation, the display may be part of a mobile phone or other mobile device that is separate from, but placed within and/or affixed to, the HMD and/or HMD housing and is subsequently detachable or removable therefrom. For example, a user-accessible opening may be provided to accept and position a mobile phone or other mobile device with a display to provide an image source for the HMD. In this example, a hatch or a slot is configured to accept the mobile phone or other mobile device and provide access to a guide, a rail, one or more walls, or a shelf to position the display of the mobile device or mobile phone outside the field of view and at the geometries according to the descriptions and examples provided herein. In yet another example, an opening may provide one or more fasteners, such as a clip or deformable member that accept and detachably lock and position the display of the mobile device or mobile phone outside the field of view and at the geometries allowing reflection to the user's eyes.

As shown in FIGS. 13D and 13E, the HMD includes a sensor array 1330 includes cameras 1370, an IMU 1372, a depth sensor 1373, a sensor board 1375, an image signal processor 1377, a sensor/controller processing device 1379, and an interface 1380 to communicate with the processing system 1335.

The sensor array includes a mechanical holder and/or assembly that holds, arranges, and positions a plurality of sensors. For example, the mechanical holder accepts and holds the sensors securing the sensors to the housing of the HMD. In addition, the mechanical holder positions, arranges, and or configure the sensor to sense the user's real world environment as described in further detail below. The mechanical holder may be implemented as a single element, or be assembled from several elements. In one example, the holder holds, arranges, and positions at least three sensors, such as cameras.

A camera includes an image sensor, a lens, and a mechanical fixture (e.g., a lens holder) that holds the lens on the image sensor. The lens holder positions the lens to direct rays of light onto the surface of the image sensor. The lens is an optical unit that can concentrate and direct the light rays on the Image Sensor. In one example, an image sensor is a device, typically made of CMOS or CCD semiconductor technology that consists of an array of light sensitive elements or "pixels." The light detected may be any electromagnetic radiation sensed by the elements, such as, for example, light in the visible spectrum, the infra-red spectrum or the ultra-violet spectrum to which the sensor is attuned. The camera can provide video or still images. As shown in FIG. 1, the cameras include a monochrome camera, a color camera, and a depth camera.

In one example, the sensor array includes two monochrome ("mono") cameras. The mono cameras include an image sensor that is optimized for sensing monochrome/grayscale/black-and-white light information (e.g., grayscale video, grayscale still images, etc.). Alternatively, more than two mono cameras can be used. The image sensors are paired with lenses that have a wide field of view (FOV), such as, for example, a fisheye lens that can support an FOV of approximately 140 to 180 degrees, when matched with a compatible image sensor. In one example, the lenses may have a substantially the same FOV, such as, for example, approximately 160 degrees.

In one implementation, the mono cameras may be configured to sense features of the user's real world environment. For example, the mono camera may be use to capture images depicting corners, texture patterns, high frequency textures, lines, sharp edges or other similar entities that can be tracked via computer vision algorithms. Examples of features include Harris corners, Sobel edges, Canny edges, KLT features/Good Features To Track, Features from accelerated segment test (FAST) features, (Oriented FAST and Rotated BRIEF) ORB, Simultaneous localization and mapping (SLAM), BRISK, SURF features and the like.

The detected features are processed by computer vision algorithms of various applications to sense the user's real world environment. For example, information obtained from the mono cameras is used for pose estimation. The techniques that enable pose estimation, such as Visual-Inertial Odometry/Navigations, SLAM, Visual-Inertial SLAM, and the like. In one example, to support these techniques (e.g., techniques that track features where the features do not appear to have moved significantly between frames), the mono cameras have a frame rate of at least 60 frames per second. Of course, higher frame rates (e.g., 120 and greater) may be used when suitable computational resources support these rates.

The mono cameras may be arranged by the mechanical holder to provide different area of coverage of features within the real world environment relative to the user. Examples of various configurations of the mono cameras is discussed in further detail below.

In one example, the sensor array includes at least one depth sensor. The depth sensor includes a depth image sensor that senses the distance of an object/scene within the real world environment of the user. For example, the depth image sensor senses the distance for each pixel of the image sensor.

In one example, the depth sensor is a Time of Flight (TOF) Camera. For example, the camera includes a light emission device or projector and measures the time between the emission of light from the device and the returned reflection of light from a real world object that is detected by the image sensor, which is referred to as time of flight depth sensing. In one example, the light projector emits a predefined pattern, and the depth of the scene images captured by the camera are algorithmically converted to a depth image where each pixel contains the depth of the scene (e.g., structured light depth sensing). In one example, the TOF camera includes a wide-angle lens. For example, a lens with angle of greater than 100-120 degrees in order to sense an environment similar to that perceived by the vision of a user observing their environment.

In another example, two or more cameras may be used to form a stereo pair (e.g., using two cameras) or an N-Camera Rig (e.g., using N cameras) that generate video feeds that are algorithmically combined together to yield a depth image (e.g., passive stereo depth sensing). Stereo depth sensing also can be assisted by a light projector that emits a pre-defined pattern and/or a speckle pattern onto the scene to be sensed allowing surfaces with a poor texture (e.g., surfaces that do not demonstrate high-resolution texture) to improve the quality of algorithms used to acquire stereo depth. This is referred to as active stereo depth sensing.

The output depth images from the depth camera are used for Hand Tracking and Environment Sensing. In addition, the output may be used for Semantic Recognition and Pose Estimation. The output from the depth sensor is used as an input for Hand Sensing. For example, the depth sensor provides depth values that allow motion of hands and their interaction with digital content to be determined. In addition, the output from the depth sensor is used as an input for Environment Sensing. For example, the depth sensor provides a representation of the user's environment to form of point clouds of data points, a depth map of environment features, and/or three-dimensional (3D) meshes of the environment of the user. Furthermore, the depth sensor also can assist other processes, such as Semantic Recognition by sensing information about the shapes of objects and scenes used to differentiating characteristics of the object or the scene. Finally, the Depth Sensor can provide additional data as input to Pose Estimation resulting in determinations that are more robust. For example, the depth data allows the implementation of RGBD SLAM algorithms that combine RGB data with depth information, depth-based SLAM algorithms (such as Kinect Fusion), and also can aid estimation of a scale factor of the trajectory of a monocular Slam and/or Visual Inertial Navigation system.

User hand positions can change quickly. At the same time, the interaction of the user's hands with the virtual environment should appear smooth to the user. Therefore, in one example, the depth sensor has a frame rate that captures depth images at least 60 frames per second for hand sensing. However, other depth sensing solutions typically need more power to be able to sense objects that are relatively far from the user. Therefore, for given power consumption, the depth sensor provides a limited sensing range in terms of depth. In order to be able to sense the environment (e.g., Environment Sensing), as well as hands (e.g., Hand Sensing), the depth sensor supports a long-range mode that operates at a rate lower than 60 frames per second. The lower frame rate limits the power consumption of the sensor. In one example, a frame rate of 15 frames per second may be used in long range sensing. The depth sensor may be controlled to sense information at both a short ranges (e.g., hands) and long range (e.g., environment). In one example, the sensor may be controlled to operate in different modes, such as for example, a hand-range mode, a long-range mode, or at an interleaved mode where the sensor returns two depth feeds simultaneously (e.g., every $1/60$ sec provides a near-range image and every $1/15$ sec provides a long range image).

In one example, the sensor array includes a color camera that senses color information (e.g., can transmit color video, color still images). Alternatively, more than one color camera can be used. In one example, the color camera is an RGB camera that includes an image sensor that encodes color information using red, green, and blue channels. The RGB camera includes a wide-angle lens, for example, a lens with an angle greater than 100-120 degrees. In one example, the camera acts as an action camera that mimicking the wide FOV of the human eye.

In one example, the RGB camera has a resolution high enough to convey a user's experience accurately. One skilled in the art will appreciate that a high resolution can be computational intensive if the same camera is used for computer vision processes. Therefore, in one example, to mitigate use of computation resources, the feed from the camera may be scaled to a lower resolution (e.g., using algorithms that are implemented in software or hardware).

In one example, the RGB captures images at a speed of at least 30 frames/second, which is the minimum requirement for persistence of vision of conveyed video. A frame rate of at least 60 frames/second provides a more natural-like visual experience and is able to capture faster user motions. In one implementation, the RGB camera can be switched between frame-rates, depending on the available computational resource to process the output data.

In one example, the RGB camera's provides a point of view (POV) Video. For example, the POV Video may be used to convey the user's experience to another user or device for applications, such as, for example, remote assistance, documentation, recording, cinematography, or any other similar or different application that requires a video stream with or without digital graphics overlaid. In addition, output from the RGB camera can be used to assist Pose Estimation by generating data for a SLAM or Visual Inertial Navigation algorithm. This adds more robustness to these algorithms due to the overlap of the FOV of the RGB camera with the area sensed by the mono cameras and due to the smaller FOV that allows the motion of tracked features to be captured in more detail (e.g., with higher sensitivity). For example, the mono cameras have a relatively very wide FOV and therefore may be have fewer pixels per degree of FOV; whereas, and the RGB camera has more pixels per degree because of its smaller FOV. In another example, the RGB camera can be used to apply color information to the geometric data that Environment Sensing recovers. In addition, data from the RGB camera can assist with Hand Sensing, for example, as input to hand segmentation and hand detection algorithms. In addition, data from the RGB Camera can support RGBD SLAM algorithms that allow features to be tracked using the RGB data and correlation of those features with a depth value supplied by data from the depth sensor. In yet another example, RGBD SLAM supports Pose Estimation by utilizing both the RGB tracked features and their depth. For example, depth may be assigned to the RGB features using the data from camera calibration for the extrinsic parameters, a process where the relative position and orientation between two cameras is estimated.

The sensor array may include an image signal ISP processing device (ISP). An ISP is an image processor that may be implemented using a specialized digital signal processor (DSP) used for processing the raw feed of images from RGB camera. The RGB camera, as a POV Video device, is required to generate data that are aesthetically appealing to viewers of the POV Video stream. In one example, this is accomplished by an image processing pipeline to process the raw data received from the sensor. The ISP employs parallel computing to increase speed and efficiency and perform a range of tasks. For example, the ISP performs processes, such as Black Level Adjustment, Noise Reduction, White Balance, Debayering/Demosaicing, RGB blending, Gamma Correction, RGB conversion to other formats such as YUV, edge enhancement, Contrast Enhancement, False Chroma suppression, and like. Because the ISP performs these operations in a dedicated computational device, the Host System relieved of this computational load.

The sensor array includes an Inertial Measurement Unit (IMU). The IMU includes a gyroscope, an accelerometer, and a directional sensing device (e.g., magnetometer or compass). The gyroscope provides data used to sensing the angular velocity of the user. The accelerometer provides data used to determine linear acceleration of the user. The magnetometer or compass may detect magnetic fields used to determine a direction a user is facing.

In one example, data provided by the IMU is used in Pose Estimation by providing real-time data to the SLAM and Visual-Inertial Navigation, as part of a sensor fusion system that fuses visual data with gyroscope and accelerometer data. In one example, the IMU is positioned and oriented behind one of the mono cameras in order to facilitate the extrinsics (e.g., parameters that define the relative position and orientation between two sensors) calibration processing in production and algorithms. In one example, the IMU has a high frame rate, such as at least 400 frames/second. In addition, the IMU has a measure range of, for example, at least plus or minus 2G for linear acceleration and at least plus or minus 500 deg/sec for angular velocity.

One example of a sensor, sensor array and their operation with an HMD is described in U.S. Provisional Application No. 62/302,794 titled "Apparatuses, Methods and Systems for a Sensor Array Adapted for Vision Computing" filed Mar. 2, 2016, which is herein incorporated by reference in its entirety.

As explained in detail above, in one example, the processing system 1335 may be implemented using at least portions of the processing systems 1100 and 1200 to execute one more applications, programs, or management components, as described above with regard to FIGS. 11 and 12. In one example, the processing system 1335 may include a processing device, GPU, and an associated memory storing one or more applications implemented by the processing device to determine user interaction within the 3D environment as described above. In addition, the processing system generates and/or renders digital image data depicting one or more of graphics, a scene, a graphical user interface, a computer game, a movie, content from the Internet, such as web content accessed from the World Wide Web, among others that are to be presented to a viewer of the wearable HMD. Examples of applications includes media players, mobile applications, browsers, video games, and graphic user interfaces, to name but a few. In addition, virtual elements corresponding to output of the various applications name above are made interactive (e.g., an interface described in association with FIGS. 8 and 10) through use of the components 1222, 1224, 1226, 1228, or 1230 described above and the processes 600, 700, and 900 described herein.

One example of a head mounted display system and components thereof is described in U.S. patent application Ser. No. 14/945,372 titled "Wide Field of View Head Mounted Display Apparatuses, Methods and Systems" filed Nov. 18, 2015, which is herein incorporated by reference in its entirety.

As described above, the techniques described herein for a wearable VR and/or AR system can be implemented using digital electronic circuitry, or in computer hardware, firmware, software, or in combinations of them in conjunction with various combiner imager optics. The techniques can be implemented as a computer program product, i.e., a computer program tangibly embodied in a non-transitory information carrier, for example, in a machine-readable storage device, in machine-readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes and others can be performed by one or more programmable processing devices or processors executing one or more computer programs to perform the functions of the techniques described above by operating on input digital data and generating a corresponding output. Method steps and techniques also can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid state memory devices; magnetic disks, such as, internal hard disks or removable disks; magneto-optical disks; and CD-ROM and DVD-ROM disks. The processor and the memory can be supplemented by, or incorporated in special purpose logic circuitry.

The HMD may include various other components including various optical devices and frames or other structure for positioning or mounting the display system on a user allowing a user to wear the vision system while providing a comfortable viewing experience for a user. The HMD may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided in order to connect the various components and allow reception, transmission, manipulation and storage of data and programs.

In order to address various issues and advance the art, the entirety of this application (including the Cover Page, Title, Headings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A virtual or augmented reality display system that facilitates interaction between a user of the display system and a virtual element presented by the display system, the display system comprising:
    one or more sensor interfaces;
    one or more displays;
    one or more storage devices storing instructions;
    one or more processing devices configured to: receive sensor inputs from the one or more sensor interfaces that correspond to a location of a real-world object; render an image associated with the virtual element; cause the one or more displays to project light forming the rendered image of the virtual element; access the instructions from the one or more storage devices and execute the instructions, the instructions configured to cause the one or more processing devices to:
    determine properties of the virtual element including a core, a constraint parameter, and an interactive field of the virtual element;
    determine coordinates in a virtual three-dimensional (3D) space corresponding to a location of the core and a location of the interactive field of the virtual element within the virtual 3D space;
    translate the sensor inputs corresponding to real-world coordinates of the location of the real-world object into virtual coordinates corresponding to locations of the sensor inputs in the virtual 3D space;
    determine whether the locations of any of the sensor inputs are within a volume demarcated by the virtual coordinates corresponding to the interactive field;
    determine a shortest distance from the location of each sensor input within the volume to the location of the core;
    determine a force vector along each distance;
    apply the force vectors to the virtual element;
    render the one or more images of the virtual element in response to the applied force vectors;
    determine coordinates in the 3D virtual space of a new location of the core and the interactive field in response to the applied force vectors; and
    cause the one or more displays to project light corresponding to the rendered images of the virtual element that is perceived by the user as his or her interaction with the virtual element,
    wherein the virtual element is part of a virtual sliding user interface controlling a process associated with or implemented by the display system; and rendering the one or more images of the virtual element in response to the applied force vectors cause the light projected by the one or more displays to be perceived as movement of the virtual element within in a 3D field of view of the user to manipulate the virtual sliding user interface, where the constraint parameter limits movement in the virtual 3D space along a line segment and a location of the virtual element on the line segment corresponds to an input of the virtual sliding user interface.

2. The system of claim 1, wherein the instructions are further configured to cause the one or more processing devices to:
    determine whether the locations of any of the sensor inputs remain within a volume demarcated by the virtual coordinates corresponding to the new location of the interactive field; and
    cease application of the force vectors to the virtual element when none of the locations of the sensor inputs remain within the volume.

3. The system of claim 1, wherein the determined force vector for each sensor input is an attractive force and applying the force vectors to the virtual element and rendering of the one or more images of the virtual element in response to the applied force vectors cause the one or more displays to project light that is perceived by the user as the virtual element moving towards or in synchronicity with the real-world object.

4. The system of claim 1 wherein the determined force vector for each sensor input is a repellant force and applying the force vectors to the virtual element and rendering of the one or more images of the virtual element in response to the applied force vectors cause the one or more displays to project light that is perceived by the user as the virtual element moving away from the real-world object.

5. The system of claim 1, wherein determination of the shortest distance includes determining a line segment measured from a location of the virtual coordinates of a sensor input to a location of virtual coordinates located at a point of the core wherein the line segment is orthogonal to the core.

6. The system of claim 1 further comprising:
    a depth sensor configured to provide at least one sensor input corresponding to the location of the real-world object.

7. The system of claim 1 further comprising:
    one or more optical elements positioned relative to the one or more displays to reflect light of the image associated with the virtual element from at least one display to an eye of user of the system and provide the perception that the image of the virtual element is located within the 3D field of view of the user of the display system.

8. The system of claim 7 further comprising a housing assembly, wherein the housing assembly positions the one of more displays and one or more optical elements of the system relative to the head of the user when the system is worn by the user.

9. The system of claim 1, wherein the real-world object is an appendage of the user, and the plurality of sensor inputs includes a point cloud associated with at least a detected portion of the appendage.

10. A virtual or augmented reality display system that facilitates interaction between a user of the display system and a virtual element presented by the display system, the display system comprising:
one or more sensor interfaces;
one or more displays;
one or more storage devices storing instructions;
one or more processing devices configured to: receive sensor inputs from the one or more sensor interfaces that correspond to a location of a real-world object, render an image associated with the virtual element cause the one or more displays to project light forming the rendered image of the virtual element access the instructions from the one or more storage devices and execute the instructions, the instructions configured to cause the one or more processing devices to:
determine properties of the virtual element including a core and an interactive field of the virtual element;
determine coordinates in a virtual three-dimensional (3D) space corresponding to a location of the core and a location of the interactive field of the virtual element within the virtual 3D space;
determine properties of the virtual element including another interactive field of the virtual element;
determine coordinates in the virtual three-dimensional (3D) space corresponding to a location of the another interactive field of the virtual element within the virtual 3D space;
translate the sensor inputs corresponding to real-world coordinates of the location of the real-world object into virtual coordinates corresponding to locations of the sensor inputs in the virtual 3D space;
determine whether the locations of any of the sensor inputs are outside of a volume demarcated by the another interactive field and within the volume demarcated by the virtual coordinates corresponding to the interactive field;
determine a shortest distance to the core from the location of each sensor input outside of the volume demarcated by the another interactive field and within the volume demarcated by the interactive field,
determine a force vector along each distance of each sensor input outside of the volume demarcated by the another interactive field and within the volume demarcated by the interactive field;
apply the force vectors to the virtual element;
render the one or more images of the virtual element in response to the applied force vectors; and
cause the one or more displays to project light corresponding to the rendered images of the virtual element that is perceived by the user as his or her interaction with the virtual element.

11. The system of claim 10, wherein the instructions are further configured to cause the one or more processing devices to:
determine coordinates in the 3D virtual space of a new location of the core and the interactive field in response to the applied force vectors, wherein rendering the one or more images of the virtual element in response to the applied force vectors cause the light projected by the one or more displays to be perceived as movement of the virtual element within in a 3D field of view of the user.

12. The system of claim 11, wherein the virtual element is part of a virtual user interface controlling a process associated with or implemented by the display system and a perceived location of the virtual element corresponds to an input of the virtual interface controlling the process.

13. The system of claim 11, wherein the determined properties of the virtual element further include a constraint parameter of the virtual element and the application of the force vectors to the virtual element is limited by the constraint parameter.

14. The system of claim 13 wherein the constraint parameter constrains movement of a location of the virtual element in the virtual 3D space.

15. The system of claim 10, wherein the rendered one or more images of the virtual element as modified in response to the applied force vectors is an input for a virtual interface and the projected light corresponding to the rendered images of the virtual element is perceived by the user as his or her manipulation of the virtual interface.

16. A method facilitating interaction between a user of virtual or augmented reality display system and a virtual element presented by the display system, the method comprising:
determining properties of the virtual element including a core, a constraint parameter, and an interactive field of the virtual element;
determining coordinates in a virtual three-dimensional (3D) space corresponding to a location of the core and a location of the interactive field of the virtual element within the virtual 3D space;
translating the sensor inputs corresponding to real-world coordinates of the location of the real-world object into virtual coordinates corresponding to locations of the sensor inputs in the virtual 3D space;
determining whether the locations of any of the sensor inputs are within a volume demarcated by the virtual coordinates corresponding to the interactive field;
determining a shortest distance from the location of each sensor input within the volume to the location of the core;
determining a force vector along each distance;
applying the force vectors to the virtual element;
rendering the one or more images of the virtual element in response to the applied force vectors;
determining coordinates in the 3D virtual space of a new location of the core and the interactive field in response to the applied force vectors; and
causing one or more displays to project light corresponding to the rendered images of the virtual element that is perceived by the user as his or her interaction with the virtual element
wherein the virtual element is part of a virtual sliding user interface controlling a process associated with or implemented by the display system; and rendering the one or more images of the virtual element in response to the applied force vectors cause the light projected by the one or more displays to be perceived as movement of the virtual element within in a 3D field of view of the user to manipulate the virtual sliding user interface, where the constraint parameter limits movement in the virtual 3D space along a line segment and a location of the virtual element on the line segment corresponds to an input of the virtual sliding user interface.

17. The method of claim 16, further comprising:
determining whether the locations of any of the sensor inputs remain within a volume demarcated by the virtual coordinates corresponding to the new location of the interactive field; and ceasing application of the force vectors to the virtual element when none of the locations of the sensor inputs remain within the volume.

18. The method of claim 16, wherein the determined force vector for each sensor input is an attractive force and applying the force vectors to the virtual element and rendering of the one or more images of the virtual element in response to the applied force vectors cause the one or more displays to project light that is perceived by the user as the virtual element moving towards or in synchronicity with the real-world object.

19. The method of claim 16 wherein the determined force vector for each sensor input is a repellant force and applying the force vectors to the virtual element and rendering of the one or more images of the virtual element in response to the applied force vectors cause the one or more displays to project light that is perceived by the user as the virtual element moving away from the real-world object.

20. The method of claim 16, wherein determining of the shortest distance includes determining a line segment measured from a location of the virtual coordinates of a sensor input to a location of virtual coordinates located at a point of the core wherein the line segment is orthogonal to the core.

21. The method of claim 16, wherein the real-world object is an appendage of the user, and the plurality of sensor inputs includes a point cloud associated with at least a detected portion of the appendage.

22. A method facilitating interaction between a user of virtual or augmented reality display system and a virtual element presented by the display system, the method comprising:
  determining properties of the virtual element including a core and an interactive field of the virtual element;
  determining coordinates in a virtual three-dimensional (3D) space corresponding to a location of the core and a location of the interactive field of the virtual element within the virtual 3D space;
  determining properties of the virtual element including another interactive field of the virtual element;
  determining coordinates in the virtual three-dimensional (3D) space corresponding to a location of the another interactive field of the virtual element within the virtual 3D space;
  translating the sensor inputs corresponding to real-world coordinates of the location of the real-world object into virtual coordinates corresponding to locations of the sensor inputs in the virtual 3D space;
  determining whether the locations of any of the sensor inputs are outside of a volume demarcated by the another interactive field and within the volume demarcated by the virtual coordinates corresponding to the interactive field;
  determining a shortest distance to the core from the location of each sensor input outside of the volume demarcated by the another interactive field and within the volume demarcated by the interactive field;
  determining a force vector along each distance of each sensor input outside of the volume demarcated by the another interactive field and within the volume demarcated by the interactive field;
  applying the force vectors to the virtual element;
  rendering the one or more images of the virtual element in response to the applied force vectors; and
  causing one or more displays to project light corresponding to the rendered images of the virtual element that is perceived by the user as his or her interaction with the virtual element.

23. The method of claim 22 further comprising:
  determining coordinates in the 3D virtual space of a new location of the core and the interactive field in response to the applied force vectors, wherein rendering the one or more images of the virtual element in response to the applied force vectors cause the light projected by the one or more displays to be perceived as movement of the virtual element within in a 3D field of view of the user.

24. The method of claim 23, wherein the virtual element is part of a virtual user interface controlling a process associated with or implemented by the display system and a perceived location of the virtual element corresponds to an input of the virtual interface controlling the process.

25. The method of claim 23, wherein the determined properties of the virtual element further include a constraint parameter of the virtual element and the applying of the force vectors to the virtual element is limited by the constraint.

26. The method of claim 25, wherein the constraint parameter constrains movement of a location of the virtual element in the virtual 3D space.

27. The method of claim 22, wherein the rendered one or more images of the virtual element as modified in response to the applied force vectors is an input for a virtual interface and the projected light corresponding to the rendered images of the virtual element is perceived by the user as his or her manipulation of the virtual interface.

* * * * *